United States Patent
Dörr et al.

(10) Patent No.: US 10,358,575 B2
(45) Date of Patent: Jul. 23, 2019

(54) POLYURETHANE UREA SOLUTIONS FOR TEXTILE COATINGS

(71) Applicant: Covestro Deutschland AG, Leverkusen (DE)

(72) Inventors: Sebastian Dörr, Düsseldorf (DE); Sophie Viala, Köln (DE); Thomas Michaelis, Leverkusen (DE)

(73) Assignee: Covestro Deutschland AG, Leverkusen (DE)

(*) Notice: Subject to any disclaimer, the term of this patent is extended or adjusted under 35 U.S.C. 154(b) by 208 days.

(21) Appl. No.: 15/501,036

(22) PCT Filed: Mar. 26, 2015

(86) PCT No.: PCT/EP2015/056572
§ 371 (c)(1),
(2) Date: Feb. 1, 2017

(87) PCT Pub. No.: WO2016/020074
PCT Pub. Date: Feb. 11, 2016

(65) Prior Publication Data
US 2017/0226376 A1    Aug. 10, 2017

(30) Foreign Application Priority Data

Aug. 5, 2014 (EP) .................................... 14179784

(51) Int. Cl.
| | | |
|---|---|---|
| *C09D 175/04* | (2006.01) | |
| *C08G 18/08* | (2006.01) | |
| *C08G 18/10* | (2006.01) | |
| *C08G 18/12* | (2006.01) | |
| *D06N 3/14* | (2006.01) | |
| *C14C 11/00* | (2006.01) | |
| *C08G 18/48* | (2006.01) | |
| *C08G 18/75* | (2006.01) | |
| *C09D 175/12* | (2006.01) | |
| *C08G 18/40* | (2006.01) | |
| *C08G 18/42* | (2006.01) | |
| *C08G 18/32* | (2006.01) | |
| *C08G 18/38* | (2006.01) | |
| *C08G 18/73* | (2006.01) | |

(52) U.S. Cl.
CPC ....... *C09D 175/04* (2013.01); *C08G 18/0852* (2013.01); *C08G 18/10* (2013.01); *C08G 18/12* (2013.01); *C08G 18/3206* (2013.01); *C08G 18/3819* (2013.01); *C08G 18/4018* (2013.01); *C08G 18/4238* (2013.01); *C08G 18/4808* (2013.01); *C08G 18/4854* (2013.01); *C08G 18/73* (2013.01); *C08G 18/755* (2013.01); *C08G 18/758* (2013.01); *C09D 175/12* (2013.01); *C14C 11/006* (2013.01); *D06N 3/14* (2013.01); *D06N 3/146* (2013.01); *D06N 2205/16* (2013.01); *D06N 2211/28* (2013.01)

(58) Field of Classification Search
CPC .................................................... C09D 175/04
USPC ...................................................... 427/385.5
See application file for complete search history.

(56) References Cited

U.S. PATENT DOCUMENTS

| | | | |
|---|---|---|---|
| 3,609,112 A | | 9/1971 | Schroeder et al. |
| 3,904,796 A | * | 9/1975 | Zorn ................ C08G 18/0852 427/389.9 |
| 3,912,680 A | * | 10/1975 | Oertel ............... C08G 18/0852 524/767 |
| 4,035,213 A | | 7/1977 | Thoma et al. |
| 4,401,801 A | | 8/1983 | Pedain et al. |
| 7,425,516 B2 | | 9/2008 | Köcher et al. |
| 2006/0189234 A1 | * | 8/2006 | Kocher ............. C08G 18/0852 442/59 |
| 2007/0166552 A1 | | 7/2007 | Hofacker et al. |
| 2010/0009582 A1 | | 1/2010 | Köcher et al. |

OTHER PUBLICATIONS

Coagulation of Polyurethanes, New Materials Permeable to Water Vapor, Harro Träubel, Springer Verlag, Berlin, Heidelberg, New York, 1999, ISBN 3-540-64946-8, pp. 42-63.

* cited by examiner

*Primary Examiner* — Tabatha L Penny
(74) *Attorney, Agent, or Firm* — John E. Mrozinski, Jr.

(57) ABSTRACT

The invention relates to a method for coating textiles and/or leather, comprising applying at least one polyurethane urea dissolved in a solvent or solvent mixture, wherein the solvent consists of one or more monohydroxy-functional alcohols, or a solvent mixture consisting of organic solvents, containing >80 wt. % of at least one monohydroxy-functional alcohol in relation to the total mass of the solvent mixture is used, and wherein the polyurethane urea is formed by: a) at least one araliphatic, aliphatic and/or cycloaliphatic diisocyanate; b) at least one polyether polyol having a number average molecular weight $M_n \geq 400$ and $\leq 6000$ g/mol and an average hydroxyl functionality of $\geq 1.5$ and $\leq 4$; c) at least one amino-functional compound having at least two isocyanate reactive amino groups; and optionally other components. The invention also relates to a textile or leather coating produced using this method and a dissolved polyurethane urea, and to the use of the polyurethane urea for coating substrates and for producing free films.

18 Claims, No Drawings

POLYURETHANE UREA SOLUTIONS FOR TEXTILE COATINGS

CROSS-REFERENCE TO RELATED APPLICATIONS

This application is a National Phase Application of PCT/EP2015/056572 filed Mar. 26, 2015, which claims priority to European Application No. 14179784.5, filed Aug. 5, 2014, both of which are incorporated herein by reference.

FIELD OF THE INVENTION

The present invention relates to a process for coating textiles and leather, in which a polyurethane urea solution is used, and to a textile or leather coating obtainable by this process. The invention further provides a specific dissolved polyurethane urea and for the use of this polyurethane urea for coating of substrates and for production of free films.

BACKGROUND OF THE INVENTION

The coating of textile materials and leather with polyurethane systems is prior art. A distinction is drawn here between aqueous polyurethane dispersions and solvent-containing systems.

The aqueous polyurethane systems cover a wide field of use and have the advantage of needing essentially no volatile organic substances. Because of their necessarily hydrophilic character, corresponding coatings, however, have lower water stability than the corresponding polyurethane coatings produced from organic solutions, since the hydrophilizing groups remain in the coating film. For production of coatings with good water stability, therefore, polyurethane systems composed of organic solvents are preferable over aqueous systems.

Polyurethane coatings based on organic solvents are highly appreciated among users on account of their hardness, elasticity and stability. Such systems are produced by reacting diisocyanate with linear macrodiols (polyether diols, polyester diols or polycarbonate diols) to give a prepolymer and then adjusting them to the required molar mass by reaction with diamines as chain extender. Because of the structure consisting of the hard urea segment and the soft macrodiol segment, the polyurethane urea solutions thus produced have a tendency to associate and crystallize out of organic solution. As a result, good processibility and good properties of the polyurethane coating are no longer assured. More particularly, it is problematic to produce organic solutions from polyurethane ureas having a sufficiently high molecular weight to achieve sufficiently good mechanical properties of the coating obtained without precipitation of the polyurethane ureas out of the solvents.

The use of solvent mixtures recommended in the art for the prevention of this crystallization, on account of the growth in knowledge of toxicology, has now become controversial. For aliphatic polyurethane ureas, DE-A 3 134 112 and DE-A 2 457 387, and also U.S. Pat. Nos. 3,912,680 and 3,904,796, use solvent mixtures of, for example, considerable proportions of aromatic hydrocarbons with alcohols, including mixtures of toluene or xylene with isopropanol or tert-butanol.

On the basis of recent findings in toxicology, toluene is a hazardous substance which should be used only to a limited degree in solvent mixtures for polyurethane ureas for textile coating, and should be used only with observation of relatively complex measures. The same applies to xylene, which has been classified as irritant and harmful to health. The amide- and urea-containing solvents such as dimethylformamide, dimethylacetamide, N-methylpyrrolidone or tetramethyl urea that have likewise been customary to date in textile coating are likewise solvents that have been classified as harmful to health, and therefore complex and costly safety measures have to be observed when using them.

DE-A 102008032779, WO-A 2006/089648 and WO-A 2007/082665 disclose specific polyurethane solutions which are suitable as textile coatings and must always contain γ-butyrolactone as co-solvent. However, γ-butyrolactone as co-solvent is also undesirable in some applications. Polyurethane urea solutions for coatings in general are additionally also known from U.S. Pat. No. 3,609,112. In addition, polyurethane urea coatings based on organic solvents play an important role in the production of synthetic leather by coating of textiles. Particularly, what is called the coagulation process, as described in "New Materials Permeable to Water Vapor", Harro Träubel, Springer Verlag, Berlin, Heidelberg, New York, 1999, ISBN 3-540-64946-8, pages 42 to 63, is a frequently employed method. This involves coating a textile substrate with a polyurethane solution in dimethylformamide (DMF). Subsequently, the coated substrate is guided through a plurality of DMF/water baths with increasing proportions of water. Contact with water results in coagulation of the polyurethane and formation of a microporous film. The products produced by this method are especially used as high-grade synthetic leathers, for example the CLARINO and ALCANTARA synthetic leather brands.

A great disadvantage of the granulation process is that it is necessary to use large amounts of DMF, which is classified as hazardous to health. Therefore, it is necessary to take particularly complex measures to safeguard workers, and it is necessary to dispose of or reprocess large amounts of DMF/water mixtures.

There is therefore a constant search for alternative polyurethane solutions suitable for the coagulation process in uncontroversial organic solvents.

SUMMARY OF THE INVENTION

The present invention provides a process for coating textiles and leather with polyurethane ureas, and also polyurethane ureas suitable for the process, in which coatings can be obtained with good mechanical properties, for example a high percentage elongation at break, a high breaking stress and minimum swelling in water, without having to use large volumes of solvents that are costly or harmful to health in this process. More particularly, the process should also be suitable for production of microporous textile coatings suitable as high-grade synthetic leather.

These and other advantages and benefits of the present invention will be apparent from the Detailed Description of the Invention herein below.

DETAILED DESCRIPTION OF THE INVENTION

The present invention will now be described for purposes of illustration and not limitation.

The present invention provides a process for coating textiles and leather, wherein at least one polyurethane urea dissolved in a solvent or solvent mixture is used, where the solvent consists of one or more monohydroxy-functional alcohols or a solvent mixture consisting of organic solvents containing >80% by weight, based on the total mass of the solvent mixture, of at least one mono-hydroxy-functional alcohol is used, and where the polyurethane urea is formed from
a) at least one of an araliphatic, an aliphatic and a cycloaliphatic diisocyanate,
b) at least one polyether polyol having a number-average molecular weight $M_n$ of ≥400 and ≤6000 g/mol, determined by means of GPC in THF at 23° C., and a mean hydroxyl functionality of ≥1.5 and ≤4,
c) at least one amino-functional compound having at least two isocyanate-reactive amino groups,
d) optionally, at least one alcohol having at least two hydroxyl groups and a molar mass of ≥60 and ≤399 g/mol,
e) optionally, at least one compound having a group reactive toward isocyanate groups,
f) optionally, ≤20% by weight, based on the total mass of the polyurethane urea, of at least one polyol differing from b) having a number-average molecular weight $M_n$ of ≥500 and ≤6000 g/mol and a mean hydroxyl functionality of ≥1.5 and ≤4.

The number-average molecular weight is always determined in the context of this application by gel permeation chromatography (GPC) in tetrahydrofuran (THF) at 23° C. The procedure is according to DIN 55672-1: "Gel permeation chromatography, Part 1—tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass are used for calibration. The number-average molecular weight is calculated with software support. Baseline points and evaluation limits are fixed in accordance with DIN 55672 Part 1.

It has been found that, surprisingly, tack-free textile and leather coatings can be produced by the process of the invention. The coatings obtainable by the process of the invention additionally have good mechanical properties, such as a high percentage elongation at break, high breaking stress and low swelling in water. The process of the invention does not require the use of large volumes of solvents that are costly or harmful to health, and is additionally also suitable for production of coatings which can be used as high-grade synthetic leather.

The invention further provides for the use of a polyurethane urea dissolved in a solvent or solvent mixture, where the solvent consists of one or more monohydroxy-functional alcohols or a solvent mixture consisting of organic solvents and containing >80% by weight, based on the total mass of the solvent mixture, of at least one monohydroxy-functional alcohol is used and where the polyurethane urea has been formed from
a) at least one of an araliphatic, an aliphatic and a cycloaliphatic diisocyanate,
b) at least one polyether polyol having a number-average molecular weight $M_n$ of ≥400 and ≤6000 g/mol, determined by means of GPC in THF at 23° C., and a mean hydroxyl functionality of ≥1.5 and ≤4,
c) at least one amino-functional compound having at least two isocyanate-reactive amino groups,
d) optionally, at least one alcohol having at least two hydroxyl groups and a molar mass of ≥60 and ≤399 g/mol,
e) optionally, at least one compound having a group reactive toward isocyanate groups,
f) optionally, ≤20% by weight, based on the total mass of the polyurethane urea, of at least one different polyol than b) having a number-average molecular weight $M_n$ of ≥500 and ≤6000 g/mol and a mean hydroxyl functionality of ≥1.5 and ≤4,
for coating of textiles and leather.

The dissolved polyurethane urea used in accordance with the invention, including the solvent or solvent mixture, is also referred to hereinafter as polyurethane urea solution.

"Dissolved" in the context of the invention means liquid mixtures of at least two substances that are homogeneous and monophasic at 23° C., the mixtures being visually clear. "Clear" in the context of the present invention means that the turbidity values of the solution are ≤200 NTU (Nephelometric Turbidity Unit), preferably ≤50 NTU, more preferably ≤10 NTU and most preferably ≤3 NTU. Turbidity values are determined by a scattered light measurement at a 90° angle (nephelometry) at a measurement radiation wavelength of 860 nm in accordance with DIN EN ISO 7027, conducted at 23° C. with a model 2100AN laboratory turbidimeter from HACH LANGE GmbH, Berlin, Germany.

Polyurethane ureas in the context of the invention are polymeric compounds having at least two, preferably at least three, urethane-containing repeat units

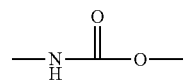

and additionally also urea-containing repeat units:

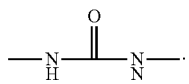

In a preferred embodiment of the process of the invention, the polyurethane urea used has no hydrophilizing groups, especially no ionic or potentially ionic or nonionically hydrophilizing groups.

Ionically hydrophilizing groups in the context of the invention are those which could be introduced into the polyurethane urea, for example, by means of suitable anionically or potentially anionically hydrophilizing compounds having at least one isocyanate-reactive group, such as a hydroxyl or amino group, and at least one functionality, for example, —COO-M$^+$, —SO$_3$-M$^+$, —PO(O-M$^+$)$_2$ where M$^+$, for example is a metal cation, H$^+$, NH$_4^+$, NHR$_3^+$, NH$_2$R$_2^+$ NH$_3$R$^+$ where each R is a C$_1$-C$_{12}$-alkyl radical, C$_5$-C$_6$-cycloalkyl radical or a C$_2$-C$_4$-hydroxyalkyl radical, which enters into a pH-dependent dissociation equilibrium on interaction with aqueous media and in this way may be negatively charged or uncharged.

Illustrative anionically or potentially anionically hydrophilizing compounds are mono- and dihydroxycarboxylic acids, mono- and dihydroxysulfonic acids, and mono- and dihydroxyphosphonic acids and salts thereof.

Nonionic hydrophilizing groups in the context of the invention are those which could be introduced into the polyurethane urea, for example, by means of suitable nonionically hydrophilizing compounds, for example polyoxyalkylene ethers containing at least one hydroxyl or amino group. Examples are the monohydroxy-functional polyalkylene oxide polyether alcohols having a statistical average of 5 to 70, preferably 7 to 55, ethylene oxide units per molecule, as obtainable by alkoxylation of suitable starter molecules (described, for example, in *Ullmanns Encyclopädie* der technischen Chemie [*Ullmann's Encyclopedia of Industrial Chemistry*], 4th edition, volume 19, Verlag Chemie, Weinheim p. 31-38). These compounds are either pure polyethylene oxide ethers or mixed polyalkylene oxide ethers, in which case, however, they contain at least 30 mol %, preferably at least 40 mol %, based on all alkylene oxide units present, of ethylene oxide units.

The polyurethane ureas of the present invention are used in the process of the invention in dissolved form in a solvent or solvent mixture, and hence as polyurethane urea solutions and not as an aqueous dispersion.

Compounds suitable as component a) are, for example, butylene 1,4-diisocyanate, pentamethylene 1,5-diisocyanate (PDI), hexamethylene 1,6-diisocyanate (HDI), isophorone diisocyanate (IPDI), 2,2,4- or 2,4,4-trimethylhexamethylene diisocyanate, the isomeric bis(4,4'-isocyanatocyclohexyl) methanes or mixtures thereof with any isomer content (H12-MDI), cyclohexylene 1,4-diisocyanate, 4-isocyanatomethyloctane 1,8-diisocyanate (nonane triisocyanate), 1,3- or 1,4-bis(2-isocyanatoprop-2-yl)benzene (TMXDI), 1,3-bis(isocyanatomethyl)benzene (XDI) and alkyl 2,6-diisocyanatohexanoates (lysine diisocyanates) having $C_1$-$C_8$-alkyl groups.

As well as the aforementioned polyisocyanates, it is also possible to use proportions of modified diisocyanates or triisocyanates having isocyanurate, urethane, allophanate, biuret, iminooxadiazinedione and/or oxadiazinetrione structure.

Preferably, the polyisocyanates or polyisocyanate mixtures are of the aforementioned type with a mean NCO functionality of 2 to 4, preferably of 2 to 2.6 and more preferably of 2 to 2.4.

Preferably, component a) is selected from aliphatic, araliphatic or cycloaliphatic diisocyanates having at least one isocyanate group bonded to a secondary and/or tertiary carbon atom.

More preferably, component a) is selected from IPDI and H12-MDI.

Further preferably, no aromatic polyisocyanates are used for preparation of the polyurethane urea.

Component a) is preferably used in amounts of ≥5% and ≤60% by weight, more preferably ≥10% and ≤40% by weight and most preferably ≥15% and ≤35% by weight, based on the total weight of the polyurethane urea.

Component b) comprises one or more polyether polyols having a number-average molecular weight $M_n$≥400 and ≤6000 g/mol and a hydroxyl functionality of ≥1.5 and ≤4, preferably having a number-average molecular weight $M_n$≥500 and ≤2500 g/mol and a hydroxyl functionality of ≥1.9 and ≤3 and more preferably having a number-average molecular weight $M_n$≥1000 and ≤2000 g/mol and a hydroxyl functionality of ≥1.9 and ≤2.1.

Suitable polyether polyols of component b) are, for example, the poly(tetramethylene glycol) polyether polyols known per se in polyurethane chemistry, as obtainable by polymerization of tetrahydrofuran by means of cationic ring opening.

Likewise suitable polyether polyols are the addition products of styrene oxide, ethylene oxide, propylene oxide, butylene oxide and epichlorohydrin onto di- or polyfunctional starter molecules. Polyalkylene glycols in particular, such as polyethylene glycols, polypropylene glycols and polybutylene glycols, are applicable, especially with the abovementioned preferred molecular weights. The polyether polyols preferably have a proportion of groups obtained from ethylene oxide of <50% by weight, preferably <30% by weight.

Suitable starter molecules used may be all compounds known according to prior art, for example water, butyldiglycol, glycerol, diethylene glycol, trimethylol-propane, propylene glycol, sorbitol, ethylenediamine, triethanolamine, butane-1,4-diol.

Preferably, component b) is selected from polypropylene glycols and poly(tetramethylene glycol) polyether polyols, more preferably selected from poly(tetramethylene glycol) polyether polyols.

In a preferred embodiment of the invention, component b) comprises one or more poly(tetramethylene glycol) polyether polyols having a number-average molecular weight $M_n$≥500 and ≤3000 g/mol and a hydroxyl functionality of ≥1.9 and ≤2.1.

In a particularly preferred embodiment, component b) is a mixture of poly(tetramethylene glycol) polyether polyols I having a number-average molecular weight $M_n$ of ≥500 and ≤1500 g/mol, more preferably of ≥600 and ≤1200 g/mol, most preferably of 1000 g/mol, and poly(tetramethylene glycol) polyether polyols II having a number-average molecular weight $M_n$ of ≥1500 and ≤3000 g/mol, more preferably of ≥1800 and ≤2500 g/mol, most preferably of 2000 g/mol.

The weight ratio of the poly(tetramethylene glycol) polyether polyols I to the poly(tetramethylene glycol) polyether polyols II is preferably in the range of ≥0.1 and ≤10, more preferably in the range of ≥0.2 and ≤8, most preferably in the range of ≥1 and ≤6.

Component b) is preferably used in amounts of ≥30% and ≤90% by weight, more preferably ≥50% and ≤85% by weight and most preferably ≥55% and ≤75% by weight, based on the total weight of the polyurethane urea.

Component c) is one or more amino-functional compounds having at least two isocyanate-reactive groups.

Suitable components c) are, for example, di- or polyamines such as ethylene-1,2-diamine, 1,2- and 1,3-diaminopropane, 1,4-diaminobutane, 1,6-diaminohexane, 2,2,4- and 2,4,4-trimethylhexamethylenediamine, 2-methylpentamethylene-diamine, diethylenetriamine, triaminononane, xylylene-1,3- and 1,4-diamine, α,α,α',α'-tetramethylxylylene-1,3- and -1,4-diamine and 4,4'-diaminodicyclohexylmethane (H12-MDA), isophoronediamine (IPDA) and/or 1,2-dimethylethylenediamine. Likewise suitable are hydrazine or hydrazides such as adipic dihydrazide. The compounds of component c) preferably contain no hydrophilizing groups, especially no ionically hydrophilizing groups.

In a particularly preferred embodiment of the invention, component c) is selected from amines having at least two isocyanate-reactive amino groups bonded to primary or secondary carbon atoms.

Further preferably, component c) is selected from diamines of symmetric structure.

Most preferably, component c) is selected from symmetric diamines having at least two isocyanate-reactive amino groups bonded to primary or secondary carbon atoms.

Preferably, component c) is selected from ethylenediamine and H12-MDA; more preferably, component c) is H12-MDA.

Component c) is preferably used in amounts of ≥2% and ≤25% by weight, more preferably ≥5% and ≤20% by weight and most preferably ≥9% and ≤16% by weight, based on the total weight of the polyurethane urea.

In a preferred embodiment of the invention, either component a) is H12-MDI or component c) is H12-MDA or component a) is H12-MDI and component c) is H12-MDA.

Optionally, the polyurethane urea is additionally formed from component d), one or more alcohols having at least two hydroxyl groups and a molar mass of ≥60 and ≤399 g/mol, for example polyols of the molar mass range mentioned having up to 20 carbon atoms, such as ethylene glycol, diethylene glycol, triethylene glycol, propane-1,2-diol, propane-1,3-diol, butane-1,4-diol, 1,3-butylene glycol, cyclohexanediol, cyclohexane-1,4-dimethanol, hexane-1,6-diol, neopentyl glycol, hydroquinone dihydroxyethyl ether, bisphenol A (2,2-bis(4-hydroxyphenyl)propane), hydrogenated bisphenol A (2,2-bis(4-hydroxyphenyl)propane), trimethylolpropane, glycerol, pentaerythritol.

Component d) is preferably used in amounts of ≥0% and ≤10% by weight, more preferably ≥0% and ≤3% by weight, based on the total weight of the polyurethane urea, and is most preferably not used at all.

In addition, the polyurethane ureas may be formed from component e), one or more compounds having a group reactive toward isocyanate groups, especially compounds having an amino or hydroxyl group. Suitable compounds of component e) are, for example, methylamine, ethylamine, propylamine, butylamine, octylamine, laurylamine, stearylamine, isononyloxypropylamine, dimethylamine, diethylamine, dipropylamine, dibutylamine, N-methylamino-propylamine, diethyl(methyl)aminopropylamine, morpholine, piperidine, methanol, ethanol, isopropanol, n-propanol, n-butanol, ethylene glycol monobutyl ether, diethylene glycol monomethyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol.

Component e) preferably does not comprise any monofunctional polyether polyols having a proportion of groups obtained from ethylene oxide of >30% by weight, preferably >50% by weight.

The monohydroxy-functional alcohol used as solvent for the polyurethane urea can likewise serve as formation component e) for the polyurethane urea.

Component e) is used preferably in amounts of ≥0% and ≤10% by weight, more preferably ≥0% and ≤3% by weight, based on the total weight of the polyurethane urea, and is most preferably not used at all, not including the monohydroxy-functional alcohol used as solvent for the polyurethane urea as component e).

The monohydroxy-functional alcohol which serves as solvent for the polyurethane urea makes up preferably ≥0% and ≤5% by weight, more preferably ≥0.01% and ≤3% by weight and most preferably ≥0.01% and ≤2% by weight of the total mass of the polyurethane urea.

The polyurethane urea may also be formed from component f), a polyol or two or more polyols having a number-average molecular weight Mn of ≥500 and ≤6000 g/mol and the hydroxyl functionality of ≥1.5 and ≤4, the polyols being different than b).

Component f) is preferably used in amounts of ≥0% and ≤20% by weight, more preferably ≥0% and ≤10% by weight, based on the total weight of the polyurethane urea, and is most preferably not used at all.

Preferably, the polyols of component f) have a number-average molecular weight $M_n$ of ≥1000 and ≤3000 g/mol and a hydroxyl functionality of ≥1.8 and ≤3.

Polyols suitable as component f) are the following polyols that are known in polyurethane coating technology: polyester polyols, polyacrylate polyols, polyurethane polyols, polycarbonate polyols, polyester polyacrylate polyols, polyurethane polyacrylate polyols, polyurethane polyester polyols, polyurethane polyether polyols, polyurethane polycarbonate polyols, polyether polycarbonate polyols and/or polyester polycarbonate polyols, especially polyester polyols and/or polycarbonate polyols.

Polyester polyols are, for example, the polycondensates of di- and optionally tri- and tetraols, and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to produce the polyesters.

Examples of diols suitable for this purpose are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate, preference being given to hexane-1,6-diol and isomers, neopentyl glycol and neopentyl glycol hydroxypivalate. In addition, it is also possible to use polyols such as trimethylolpropane, glycerol, erythritol, pentaerythritol, trimethylolbenzene or trishydroxyethyl isocyanurate.

The dicarboxylic acids used may be phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methyl-succinic acid, 3,3-diethylglutaric acid and/or 2,2-dimethylsuccinic acid. It is also possible to use the corresponding anhydrides as acid source.

If the mean hydroxyl functionality of the polyol to be esterified is greater than 2, it is additionally also possible to use monocarboxylic acids such as benzoic acid and hexanecarboxylic acid as well.

Preferred acids are aliphatic or aromatic acids of the aforementioned type.

Particular preference is given to adipic acid, isophthalic acid and optionally trimellitic acid, very particular preference to adipic acid.

Examples of hydroxycarboxylic acids that may be used as reaction participants in the preparation of a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologues. Preference is given to caprolactone.

In component f), it is also possible to use polycarbonates having hydroxyl groups, preferably polycarbonatediols, having number-average molecular weights $M_n$ of 400 to 8000 g/mol, preferably of 600 to 3000 g/mol. These are obtainable by reaction of carbonic acid derivatives, such as diphenyl carbonate, dimethyl carbonate or phosgene, with polyols, preferably diols.

Examples of such diols are ethylene glycol, propane-1,2- and 1,3-diol, butane-1,3- and 1,4-diol, hexane-1,6-diol, octane-1,8-diol, neopentyl glycol, 1,4-bishydroxy-methyl-cyclohexane, 2-methylpropane-1,3-diol, 2,2,4-trimethylpentane-1,3-diol, dipropylene glycol, polypropylene glycols, dibutylene glycol, polybutylene glycols, bisphenol A, and lactone-modified diols of the aforementioned type. The polycarbonates having hydroxyl groups preferably have a linear structure.

Further preferably, the polyurethane urea is formed from ≥5% and ≤60% by weight of component a), ≥30% and ≤90% by weight of component b), ≥2% and ≤25% by weight of component c), ≥0% and ≤10% by weight of component d), ≥0% and ≤10% by weight of component e) and ≥0% and ≤20% by weight of component f), based in each case on the total weight of the polyurethane urea, where components a) to f) add up to 100% by weight.

More preferably, the polyurethane urea is formed from ≥10% and ≤40% by weight of component a), ≥55% and ≤85% by weight of component b), ≥5% and ≤20% by weight of component c), ≥0% and ≤3% by weight of component d), ≥0% and ≤3% by weight of component e) and ≥0% and ≤1% by weight of component f), based in each case on the total weight of the polyurethane urea, where components a) to f) add up to 100% by weight.

The polyurethane urea used in accordance with the invention preferably has a number-average molecular weight $M_n$ of ≥3000 and ≤100 000 g/mol, more preferably of ≥5000 and ≤50 000 g/mol. Polyurethane ureas of this molar mass are particularly suitable for obtaining coatings having good mechanical properties. In a preferred embodiment of the invention, the polyurethane urea used in accordance with the invention is formed from
a) at least one of an aliphatic, an araliphatic and a cycloaliphatic diisocyanate having at least one isocyanate group bonded to a secondary or tertiary carbon atom,
b) at least one polyether polyol having a number-average molecular weight $M_n$ of ≥500 and ≤2500 g/mol and a hydroxyl functionality of ≥1.9 and ≤3,
c) at least one amino-functional compound selected from symmetric diamines having at least two isocyanate-reactive amino groups bonded to primary or secondary carbon atoms,
d) optionally, at least one alcohol having at least two hydroxyl groups and a molar mass of ≥60 and ≤399 g/mol,
e) optionally, at least one compound having a group reactive toward isocyanate groups and
f) optionally, ≤20% by weight, based on the total mass of the polyurethane urea, of at least one different polyol than b) having a number-average molecular weight $M_n$ of ≥500 and ≤6000 g/mol and a hydroxyl functionality of ≥1.5 and ≤4.

Further preferably, the polyurethane urea, in this aforementioned embodiment, is formed from ≥5% and ≤60% by weight of component a), ≥30% and ≤90% by weight of component b), ≥2% and ≤25% by weight of component c), ≥0% and ≤10% by weight of component d), ≥0% and ≤10% by weight of component e) and ≥0% and ≤20% by weight of component f), based in each case on the total weight of the polyurethane urea, where components a) to f) add up to 100% by weight.

More preferably, the polyurethane urea, in this aforementioned embodiment, is formed from ≥10% and ≤40% by weight of component a), ≥55% and ≤85% by weight of component b), ≥5% and ≤20% by weight of component c), ≥0% and ≤3% by weight of component d), ≥0% and ≤3% by weight of component e) and ≥0% and ≤1% by weight of component f), based in each case on the total weight of the polyurethane urea, where components a) to f) add up to 100% by weight.

In a particularly preferred embodiment of the invention, the polyurethane urea used in accordance with the invention is formed from
a) at least one isocyanate selected from IPDI and H12-MDI,
b) at least one polyether polyol having a number-average molecular weight $M_n$≥500 and ≤2500 g/mol and a hydroxyl functionality of ≥1.9 and ≤3, selected from polypropylene glycols and/or poly(tetramethylene glycol) polyether polyols,
c) at least one amino-functional compound is selected from ethylenediamine and H12-MDA,
d) optionally at least one alcohol having at least two hydroxyl groups and a molar mass of ≥60 and ≤399 g/mol,
e) optionally, at least one compound having a group reactive toward isocyanate groups, and
f) optionally, ≤20% by weight, based on the total mass of the polyurethane urea, of at least one different polyol than b) having a number-average molecular weight $M_n$ of ≥500 and ≤6000 g/mol and a hydroxyl functionality of ≥1.5 and ≤4.

Further preferably, the polyurethane urea, in this aforementioned embodiment, is formed from ≥5% and ≤60% by weight of component a), ≥30% and ≤90% by weight of component b), ≥2% and ≤25% by weight of component c), ≥0% and ≤10% by weight of component d), ≥0% and ≤10% by weight of component e) and ≥0% and ≤20% by weight of component f), based in each case on the total weight of the polyurethane urea, where components a) to f) add up to 100% by weight.

More preferably, the polyurethane urea, in this aforementioned embodiment, is formed from ≥10% and ≤40% by weight of component a), ≥55% and ≤85% by weight of component b), ≥5% and ≤20% by weight of component c), ≥0% and ≤3% by weight of component d), ≥0% and ≤3% by weight of component e) and ≥0% and ≤1% by weight of component f), based in each case on the total weight of the polyurethane urea, where components a) to f) add up to 100% by weight.

Preferably, the polyurethane urea is formed from components a) to c) and optionally d) to f), more preferably from components a) to c).

The polyurethane urea is preferably prepared by reacting components a) and b) and optionally d) and f) in a first step to give an NCO-terminated prepolymer, which is then reacted in a subsequent step with component c) and optionally components d) and e).

For the preparation of the polyurethane ureas, preferably, components a) and b) and optionally d) and f) for preparation of an NCO-terminated prepolymer are initially charged in full or in part, optionally diluted with a solvent inert toward isocyanate groups, and heated up to temperatures in the range from 50 to 120° C. The isocyanate addition reaction can be accelerated using the catalysts known in polyurethane chemistry. A preferred variant, however, works without the addition of urethanization catalysts.

Subsequently, any constituents of a) and b) and optionally d) and f) which have not yet been added at the start of the reaction can be metered in.

In the preparation of the NCO-terminated prepolymers from components a) and b) and optionally d) and f), the molar ratio of isocyanate groups to isocyanate reactive groups is generally ≥1.05 and ≤3.5, preferably ≥1.1 and ≤3.0, more preferably ≥1.1 and ≤2.5.

Isocyanate-reactive groups are understood to mean all groups reactive toward isocyanate groups, for example primary and secondary amino groups, hydroxyl groups or thiol groups.

The conversion of components a) and b) and optionally d) and f) to the prepolymer is effected in part or in full, but preferably in full. In this way, polyurethane prepolymers containing free isocyanate groups are obtained in substance or in solution.

Preferably, the NCO-terminated prepolymer is prepared from components a) and b).

Thereafter, preferably, in a further process step, if this has been done only partly, if at all, the prepolymer obtained is dissolved with the aid of one or more organic solvents. The solvent used is preferably likewise a solvent or solvent mixture, where the solvent consists of one or more monohydroxy-functional alcohols or a solvent mixture consisting of organic solvents containing ≥50% by weight, based on the total mass of the solvent mixture, of at least one monohydroxy-functional alcohol is used. In respect of the solvent and solvent mixture, the preferred embodiments below relating to the solvent or solvent mixture in which the polyurethane urea is dissolved are likewise applicable.

The solvent or solvent mixture may also be different than the solvent or solvent mixture in which the polyurethane urea as end product is dissolved at a later stage. The solvent or solvent mixture is preferably identical to the solvent or solvent mixture in which the polyurethane urea as end product is dissolved at a later stage.

Preferably, the solvent used in the preparation comprises one or more monohydroxy-functionalized alcohols.

The ratio of solvent to prepolymer is preferably ≥1:10 and ≤5:1, more preferably ≥1:2 and ≤2:1, parts by weight.

Prior to the dissolution, the prepolymer is cooled down to temperatures of −20 to 80° C., preferably 0 to 50° C. and more preferably 15 to 40° C.

In a further step that optionally follows the dissolution of the NCO-terminated prepolymer, the NCO-terminated prepolymer obtained in the first step is then preferably reacted fully or partly with component c) and optionally components d) and e). This reaction is generally referred to as chain extension, or in the case of component e) as chain termination.

Preference is given here to initially charging the NCO-terminated prepolymer, and metering in components c) and optionally d) and e). Preference is given to firstly partly reacting the NCO groups of the prepolymer with components c) and optionally d), followed by chain termination by reaction of the remaining NCO groups with component e). Components c) and optionally e) may also be added stepwise in two or more steps, especially in two steps.

Component c) and optionally d) and e) are preferably used dissolved in one or more organic solvents. The solvent used is preferably likewise a solvent or solvent mixture, where the solvent consists of one or more monohydroxy-functional alcohols or a solvent mixture consisting of organic solvents containing ≥50% by weight, based on the total mass of the solvent mixture, of at least one monohydroxy-functional alcohol is used. In respect of the solvent and solvent mixture, the preferred embodiments below relating to the solvent or solvent mixture in which the polyurethane urea is dissolved are likewise applicable.

The solvent or solvent mixture may also be different than the solvent or solvent mixture in which the polyurethane urea as end product is dissolved at a later stage. The solvent or solvent mixture is preferably identical to the solvent or solvent mixture in which the polyurethane urea as end product is dissolved at a later stage.

Preferably, the solvent used in the preparation for component c) comprises one or more monohydroxy-functionalized alcohols.

When solvents are used as diluents, the diluent content in the components c) used in the chain extension, and optionally d) and e), is preferably 1% to 95% by weight, preferably 3% to 50% by weight, based on the total weight of component c) and optionally d) and e) including diluents.

Components c) and optionally d) and e) are preferably added at temperatures of −20 to 60° C., preferably 0 to 50° C. and more preferably of 15 to 40° C.

The degree of chain extension, i.e. the molar ratio of NCO-reactive groups of the components c) used for chain extension and chain termination, and optionally d) and e), to free NCO groups of the prepolymer, is especially ≥50 and ≤120%, more preferably ≥60 and ≤100% and most preferably ≥70 and ≤95%.

Preferably, the molar ratio of isocyanate-reactive groups of component c) to the free NCO groups of the prepolymer is ≥50% and ≤120%, more preferably ≥60% and ≤100% and most preferably ≥70% and ≤95%.

In a preferred embodiment of the invention, the free NCO groups of the prepolymer are only partly reacted with component c), the molar ratio of isocyanate-reactive groups of component c) to the free NCO groups of the prepolymer preferably being ≥60% and ≤95% and the remaining free NCO groups being depleted by reaction with the hydroxyl groups of the solvent, so as to form an NCO-free polyurethane urea.

After the preparation, the polyurethane urea, if solvents or solvent mixtures of the invention have already been used in the preparation process, can still be diluted and dissolved with a solvent or solvent mixture, in which case the solvent consists of one or more monohydroxy-functional alcohols or a solvent mixture consisting of organic solvents containing ≥50% by weight, based on the total mass of the solvent mixture, of at least one monohydroxy-functional alcohol is used.

If no solvents or solvent mixtures have been used during the reaction, after the polyurethane urea has been prepared, it is used in a solvent or solvent mixture, in which case the solvent consists of one or more mono-hydroxy-functional alcohols or a solvent mixture consisting of organic solvents and containing ≥50% by weight, based on the total mass of the solvent mixture, of at least one monohydroxy-functional alcohol is used.

The dissolution of the polyurethane urea can be effected by standard techniques for shearing, for example by stirring with standard stirrers as specified in DIN 28131.

Suitable solvents or constituents of the solvent mixture are in principle all monohydroxy-functional aliphatic alcohols having one to six carbon atoms, for example methanol, ethanol, n-propanol, isopropanol, n-butanol, sec-butanol, 2-ethylhexanol and/or ethylene glycol monobutyl ether. More preferably, the monohydroxy-functional alcohol is ethanol or isopropanol, most preferably isopropanol.

If a solvent mixture is used, as well as the monohydroxy-functional alcohols, it is also possible to use ≤20% by weight, based on the total weight of the solvent mixture, of a further organic solvent. Suitable solvents here are, for example, esters, for example ethyl acetate, butyl acetate, methoxypropyl acetate or butyrolactone, ketones, for example acetone or methyl ethyl ketone, ethers, for example tetrahydrofuran or tert-butyl methyl ether, aromatic solvents, for example xylene or solvent naphtha. In the case of use of ethanol, typical denaturing agents may be present as additives in the customary added amounts.

Preferably, the proportion of the further organic solvents is ≤10% by weight, more preferably ≤5% by weight and most preferably ≤2% by weight, based on the total weight of the solvent mixture. In a most preferred embodiment, no further organic solvents are present aside from monohydroxy-functional aliphatic alcohols.

Further solvents that are disadvantageous are solvents such as dimethyl-formamide, N-methylpyrrolidone or toluene, for example, as used as co-solvents for polyurethanes or polyurethane ureas.

The further solvents are not water. The polyurethane urea solution obtained by dissolving the polyurethane urea in the solvents or solvent mixture is used in accordance with the invention is preferably anhydrous, excluding the proportions of water present as a result of the preparation in the organic solvents used.

The water content of the polyurethane urea solution is ≤10% by weight, preferably ≤4.5% by weight and most preferably ≤1% by weight, based on the total mass of the polyurethane urea solution.

The proportion of the polyurethane urea in the polyurethane urea solution used in accordance with the invention (also referred to as solids content) is preferably ≥10% and ≤80% by weight, more preferably ≥15% and ≤60% by weight and most preferably ≥20% and ≤50% by weight, based on the total weight of the polyurethane urea solution.

Added to the polyurethane urea solution used in accordance with the invention as well as the polyurethane ureas and the solvents may be additives, auxiliaries and additions, such as antifoams, degassing agents, thickeners or thixotropic agents, antioxidants, light stabilizers, emulsifiers, plasticizers, pigments, dyes, matting agents, grip aids, fillers, additives for container stabilization, biocides, hydrophobization agents and/or leveling aids. These additives are preferably present in a concentration of ≤15% by weight, more preferably ≥0.01% and ≤10% by weight, based on the total weight of the polyurethane urea solution.

The dissolved polyurethane urea is preferably applied directly to a carrier with customary application or coating units, for example a doctor blade, e.g. a coating bar, rollers or other equipment. Printing, spraying or dipping is also possible. The application can be effected on one or both sides.

Suitable carrier materials are preferably textile fabrics. Particular preference is given to fibrous materials as carriers for the compositions of the invention.

Textile fabrics in the context of the invention include, for example, woven fabrics, knitted fabrics, and bonded and unbonded nonwoven fabrics. The textile fabrics may be formed from synthetic and/or natural fibers and/or mixtures thereof. In principle, textiles made from any desired fibers are suitable for the process of the invention. By means of the composition of the invention, it is possible to treat or upgrade the carriers in all the customary ways, preferably by treating or bonding the fibers to one another or substrates to one another.

Before, during or after the application of the polyurethane urea solution, the textile carriers can be surface treated, for example by pre-coating, peaching, velourizing, roughening and tumbling.

Alternatively, the textile coating can be effected by what is called the transfer process. This involves first applying the coating to a release paper and curing it, and laminating it onto the ultimate carrier material in a second step.

The compositions of the invention can also be applied to a carrier material in two or more layers. It is also possible for there to be intermediate drying steps.

After the application, the treated materials can be dried. For quicker drying for the evaporation of the water and of any remaining solvent, preference is given to utilizing temperatures of ≥20° C. Preference is given to temperatures of ≥30 and ≤200° C. Another possibility is two-stage or multistage drying, with a correspondingly rising temperature gradient, in order to prevent ebullition of the polymer layer. The drying is generally effected using heating and drying apparatus known in the art, such as (air circulation) drying cabinets, hot air driers or IR radiators. Another possibility is drying by guiding the coated substrate over heated surfaces, for example rollers. The application and drying can each be conducted batchwise or continuously, but preference is given to an entirely continuous process.

The polymer layer produced by means of the process of the invention can be provided with further layers. This can be done on one or both sides, in one layer or in several layers one on top of another, by complete coating or by coating over partial areas of the film. It is also possible to prime the carrier material with one or more layers prior to application of the polyurethane urea of the invention.

In a preferred embodiment of the process of the invention, the dissolved polyurethane urea is applied to a textile material and leather in a first step and the polyurethane urea is coagulated upon or within the textile material and/or leather by contact with water in a subsequent step.

The polyurethane urea solution is preferably applied by dipping and then stripping off, or areal application with the aid of doctor blades and rollers.

The water is in pure form or in a mixture with further solvents. In a preferred variant the water is provided in pure form; in another preferred variant, the water is provided in a mixture with the solvent(s) which is/are also used as solvents in the polyurethane urea solution of the invention. In a preferred variant, several water baths are used in succession, more preferably with a decreasing solvent content of the water baths. The coagulation of the polyurethane urea is preferably already completed in a first water bath. This water bath preferably has a temperature of ≥10 and ≤80° C., more preferably of ≥20 and ≤50° C. and most preferably of ≥20 and ≤30° C. Preferably, the coated textile material or leather remains in the first water bath for ≥0.5 and ≤60 min, more preferably ≥1 and ≤30 min and most preferably ≥2 and ≤20 min. The choice of this residence time depends on the layer thickness of the coating and also of the treated material.

Subsequently, the coated carrier material is preferably guided through at least two further successive water baths that run in countercurrent. These serve to wash out the solvent. Between the individual water baths, the material can be squeezed, in order to lower the solvent content.

Thereafter, the treated textile material or leather can be dried in order to remove the water absorbed and any solvent still remaining.

Drying can be accomplished using the abovementioned drying conditions and processes. Preferably, the drying is effected by a temperature-controlled conveyor belt process with different successive temperature zones. Preference is given to three different successive temperature zones, the temperature of the first zone preferably being ≥70 and ≤90° C., that of the second temperature zone ≥91 and ≤120° C., and that of the third temperature zone ≥121 and ≤155° C.

The total duration of the drying may, depending on the layer thickness of the coating on the material, be preferably ≥1 and ≤60 min, more preferably ≥2 and ≤30 min and most preferably ≥3 and ≤20 min.

The polymer layer produced by means of the process of the invention can be provided with further layers. This can be done on one or both sides, in one layer or in several layers one on top of another, by complete coating or by coating over partial areas of the film.

The process of the invention is suitable, for example, for coating or production of outerwear, synthetic leather articles, shoes, gloves, furniture covers, automobile interior trim articles, sports equipment, protective shells, textile materials for building applications, tarpaulins, tents and industrial textiles, for example conveyor belts.

The invention further provides textile or leather coatings obtainable by the process of the invention.

The coatings of the invention advantageously have an elongation at break of ≥100% and ≤1500%, preferably of ≥300% and ≤1300% and more preferably of ≥500% and ≤1200%. Elongation at break is determined by the method specified in the examples section.

Further advantageously, the coatings of the invention advantageously have a breaking strain of ≥5 and ≤70 MPa, preferably of ≥10 and ≤65 MPa and more preferably of ≥15 and ≤60 MPa. Breaking strain is determined by the method specified in the examples section.

The invention further provides a polyurethane urea dissolved in a solvent or solvent mixture, where the solvent consists of one or more monohydroxy-functional alcohols or a solvent mixture consisting of organic solvents and containing ≥92% by weight, based on the total mass of the solvent mixture, of at least one monohydroxy-functional alcohol is used, characterized in that the polyurethane urea has been formed from a) at least one of an araliphatic, an aliphatic and a cycloaliphatic diisocyanate,
b) at least one polyether polyol having a number-average molecular weight $M_n$ of ≥400 and ≤6000 g/mol, determined by means of GPC at 23° C. in THF, and a mean hydroxyl functionality of ≥1.5 and ≤4,
c2) at least one amino-functional compound selected from symmetric diamines having at least two isocyanate-reactive amino groups bonded to primary or secondary carbon atoms
d) optionally, at least one alcohol having at least two hydroxyl groups and a molar mass of ≥60 and ≤399 g/mol,
e) optionally, at least one compound having a group reactive toward isocyanate groups,
f) optionally, ≤20% by weight, based on the total mass of the polyurethane urea, of at least one different polyol than b) having a number-average molecular weight $M_n$ of ≥500 and ≤6000 g/mol and a mean hydroxyl functionality of ≥1.5 and ≤4.

Compounds suitable as component a) are, for example, butylene 1,4-diisocyanate, pentamethylene 1,5-diisocyanate (PDI), hexamethylene 1,6-diisocyanate (HDI), isophorone diisocyanate (IPDI), 2,2,4- and 2,4,4-trimethylhexamethylene diisocyanate, the isomeric bis(4,4'-isocyanatocyclohexyl)methanes or mixtures thereof with any isomer content (H12-MDI), cyclohexylene 1,4-diisocyanate, 4-isocyanatomethyloctane 1,8-diisocyanate (nonane triisocyanate), 1,3- and 1,4-bis(2-isocyanatoprop-2-yl)benzene (TMXDI), 1,3-bis(isocyanatomethyl)benzene (XDI) and alkyl 2,6-diisocyanatohexanoates (lysine diisocyanates) having $C_1$-$C_8$-alkyl groups.

As well as the aforementioned polyisocyanates, it is also possible to use proportions of modified diisocyanates or triisocyanates having isocyanurate, urethane, allophanate, biuret, iminooxadiazinedione and/or oxadiazinetrione structure.

Preferably, the polyisocyanates or polyisocyanate mixtures are of the aforementioned type with a mean NCO functionality of 2 to 4, preferably of 2 to 2.6 and more preferably of 2 to 2.4.

Preferably, component a) is selected from aliphatic, araliphatic and cyclo-aliphatic diisocyanates having at least one isocyanate group bonded to a secondary and tertiary carbon atom.

More preferably, component a) is selected from IPDI and H12-MDI.

Further preferably, no aromatic polyisocyanates are used for preparation of the polyurethane urea.

Component a) is preferably used in amounts of ≥5% and ≤60% by weight, more preferably ≥10% and ≤40% by weight and most preferably ≥15% and ≤35% by weight, based on the total weight of the polyurethane urea.

Component b) comprises one or more polyether polyols having a number-average molecular weight $M_n$≥400 and ≤6000 g/mol and a hydroxyl functionality of ≥1.5 and ≤4, preferably having a number-average molecular weight $M_n$≥500 and ≤2500 g/mol and a hydroxyl functionality of ≥1.9 and ≤3 and more preferably having a number-average molecular weight $M_n$≥1000 and ≤2000 g/mol and a hydroxyl functionality of ≥1.9 and ≤2.1.

Suitable polyether polyols of component b) are, for example, the poly(tetramethylene glycol) polyether polyols known in polyurethane chemistry, obtainable by polymerization of tetrahydrofuran by means of cationic ring opening.

Likewise suitable polyether polyols are the addition products of styrene oxide, ethylene oxide, propylene oxide, butylene oxide and epichlorohydrin onto di- or polyfunctional starter molecules. Polyalkylene glycols in particular, such as polyethylene glycols, polypropylene glycols and polybutylene glycols, are applicable, especially with the abovementioned preferred molecular weights. The polyether polyols preferably have a proportion of groups obtained from ethylene oxide of <50% by weight, preferably <30% by weight.

Suitable starter molecules used may be all compounds known according to state of the art, for example water, butyldiglycol, glycerol, diethylene glycol, trimethylolpropane, propylene glycol, sorbitol, ethylenediamine, triethanolamine, butane-1,4-diol.

Preferably, component b) is selected from polypropylene glycols and poly(tetramethylene glycol) polyether polyols, more preferably selected from poly(tetramethylene glycol) polyether polyols.

In a preferred embodiment of the invention, component b) comprises one or more poly(tetramethylene glycol) polyether polyols having a number-average molecular weight $M_n$≥500 and ≤3000 g/mol and a hydroxyl functionality of ≥1.9 and ≤2.1.

In a particularly preferred embodiment, component b) is a mixture of poly(tetramethylene glycol) polyether polyols I having a number-average molecular weight $M_n$ of ≥500 and ≤1500 g/mol, more preferably of ≥600 and ≤1200 g/mol, most preferably of 1000 g/mol, and poly(tetramethylene glycol) polyether polyols II having a number-average molecular weight $M_n$ of ≥1500 and ≤3000 g/mol, more preferably of ≥1800 and ≤2500 g/mol, most preferably of 2000 g/mol.

The weight ratio of the poly(tetramethylene glycol) polyether polyols I to the poly(tetramethylene glycol) polyether polyols II is preferably in the range of ≥0.1 and ≤10, more preferably in the range of ≥0.2 and ≤8, most preferably in the range of ≥1 and ≤6.

Component b) is preferably used in amounts of ≥30% and ≤90% by weight, more preferably ≥50% and ≤85% by weight and most preferably ≥55% and ≤75% by weight, based on the total weight of the polyurethane urea.

Component c2) is at least one amino-functional compound selected from symmetric diamines having at least two isocyanate-reactive amino groups bonded to primary and/or secondary carbon atoms.

Suitable components c2) are, for example, di- or polyamines such as ethylene-1,2-diamine, 1,2- and 1,3-diaminopropane, 1,4-diaminobutane, 1,6-diaminohexane, diethylenetriamine, xylylene-1,3- and 1,4-diamine, α,α,α',α'-tetramethyl-xylylene-1,3- and -1,4-diamine and 4,4'-diaminodicyclohexylmethane (H12-MDA) and/or 1,2-dimethylethylenediamine. Likewise possible are hydrazine and hydrazides such as adipic dihydrazide.

The compounds of component c2) preferably contain no hydrophilizing groups, especially no ionically hydrophilizing groups.

Preferably, component c2) is selected from ethylenediamine and H12-MDA; more preferably, component c) is H12-MDA.

Component c2) is preferably used in amounts of ≥2% and ≤25% by weight, more preferably ≥5% and ≤20% by weight and most preferably ≥9% and ≤16% by weight, based on the total weight of the polyurethane urea.

In a preferred embodiment of the invention, either component a) is H12-MDI or component c2) is H12-MDA or component a) is H12-MDI and component c2) is H12-MDA.

Optionally, the polyurethane urea is additionally formed from component d), one or more alcohols having at least two hydroxyl groups and a molar mass of ≥60 and ≤399 g/mol, for example polyols of the molar mass range mentioned having up to 20 carbon atoms, such as ethylene glycol, diethylene glycol, triethylene glycol, propane-1,2-diol, propane-1,3-diol, butane-1,4-diol, 1,3-butylene glycol, cyclohexanediol, cyclohexane-1,4-dimethanol, hexane-1,6-diol, neopentyl glycol, hydroquinone dihydroxyethyl ether, bisphenol A (2,2-bis(4-hydroxy-phenyl)propane), hydrogenated bisphenol A (2,2-bis(4-hydroxyphenyl)propane), trimethylolpropane, glycerol, pentaerythritol.

Component d) is preferably used in amounts of ≥0% and ≤10% by weight, more preferably ≥0% and ≤3% by weight, based on the total weight of the polyurethane urea, and is most preferably not used at all.

In addition, the polyurethane ureas may be formed from component e), one or more compounds having a group reactive toward isocyanate groups, especially compounds having an amino or hydroxyl group. Suitable compounds of component e) are, for example, methylamine, ethylamine, propylamine, butyl-amine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, methanol, ethanol, isopropanol, n-propanol, n-butanol, ethylene glycol monobutyl ether, diethylene glycol monomethyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol. Component e) preferably does not comprise any monofunctional polyether polyols having a proportion of groups obtained from ethylene oxide of >30% by weight, preferably >50% by weight.

The monohydroxy-functional alcohol used as solvent for the polyurethane urea can likewise serve as formation component e) for the polyurethane urea.

Component e) is used preferably in amounts of ≥0% and ≤10% by weight, more preferably ≥0% and ≤3% by weight, based on the total weight of the polyurethane urea, and is most preferably not used at all, not including the monohydroxy-functional alcohol used as solvent for the polyurethane urea as componente).

The monohydroxy-functional alcohol which serves as solvent for the polyurethane urea makes up preferably ≥0% and ≤5% by weight, more preferably ≥0.01% and ≤3% by weight and most preferably ≥0.01% and ≤2% by weight of the total mass of the polyurethane urea.

The polyurethane urea may also be formed from component f), a polyol or two or more polyols having a number-average molecular weight $M_n$ of ≥500 and ≤6000 g/mol and the hydroxyl functionality of ≥1.5 and ≤4, the polyols being different than b).

Component f) is preferably used in amounts of ≥0% and ≤20% by weight, more preferably ≥0% and ≤10% by weight, based on the total weight of the polyurethane urea, and is most preferably not used at all.

Preferably, the polyols of component f) have a number-average molecular weight $M_n$ of ≥1000 and ≤3000 g/mol and a hydroxyl functionality of ≥1.8 and ≤3.

Polyols suitable as component f) are the following polyols that are known in polyurethane coating technology: polyester polyols, polyacrylate polyols, polyurethane polyols, polycarbonate polyols, polyester polyacrylate polyols, polyurethane polyacrylate polyols, polyurethane polyester polyols, polyurethane polyether polyols, polyurethane polycarbonate polyols, polyether polycarbonate polyols and polyester polycarbonate polyols, especially polyester polyols and/or polycarbonate polyols.

Polyester polyols are, for example, the polycondensates of di- and optionally tri- and tetraols, and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to produce the polyesters.

Examples of diols suitable for this purpose are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate, preference being given to hexane-1,6-diol and isomers, neopentyl glycol and neopentyl glycol hydroxypivalate. In addition, it is also possible to use polyols such as trimethylolpropane, glycerol, erythritol, pentaerythritol, trimethylolbenzene or trishydroxyethyl isocyanurate.

The dicarboxylic acids used may be phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methyl-succinic acid, 3,3-diethylglutaric acid and 2,2-dimethylsuccinic acid. It is also possible to use the corresponding anhydrides as acid source.

If the mean hydroxyl functionality of the polyol to be esterified is greater than 2, it is additionally also possible to use monocarboxylic acids such as benzoic acid and hexanecarboxylic acid as well.

Preferred acids are aliphatic or aromatic acids of the aforementioned type.

Particular preference is given to adipic acid, isophthalic acid and optionally trimellitic acid, very particular preference to adipic acid.

Examples of hydroxycarboxylic acids that may be used as reaction participants in the preparation of a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologues. Preference is given to caprolactone.

In component f), it is also possible to use polycarbonates having hydroxyl groups, preferably polycarbonatediols, having number-average molecular weights $M_n$ of 400 to 8000 g/mol, preferably of 600 to 3000 g/mol. These are obtainable by reaction of carbonic acid derivatives, such as diphenyl carbonate, dimethyl carbonate or phosgene, with polyols, preferably diols.

Examples of such diols are ethylene glycol, propane-1,2- and 1,3-diol, butane-1,3- and 1,4-diol, hexane-1,6-diol, octane-1,8-diol, neopentyl glycol, 1,4-bishydroxy-methylcyclohexane, 2-methylpropane-1,3-diol, 2,2,4-trimethylpentane-1,3-diol, dipropylene glycol, polypropylene glycols, dibutylene glycol, polybutylene glycols, bisphenol A, and lactone-modified diols of the aforementioned type. The polycarbonates having hydroxyl groups preferably have a linear structure.

Further preferably, the polyurethane urea is formed from $\geq 5\%$ and $\leq 60\%$ by weight of component a), $\geq 30\%$ and $\leq 90\%$ by weight of component b), $\geq 2\%$ and $\leq 25\%$ by weight of component c2), $\geq 0\%$ and $\leq 10\%$ by weight of component d), $\geq 0\%$ and $\leq 10\%$ by weight of component e) and $\geq 0\%$ and $\leq 20\%$ by weight of component f), where components a) to f) add up to 100% by weight.

More preferably, the polyurethane urea is formed from $\geq 10\%$ and $\leq 40\%$ by weight of component a), $\geq 55\%$ and $\leq 85\%$ by weight of component b), $\geq 5\%$ and $\leq 20\%$ by weight of component c2), $\geq 0\%$ and $\leq 3\%$ by weight of component d), $\geq 0\%$ and $\leq 3\%$ by weight of component e) and $\geq 0\%$ and $\leq 1\%$ by weight of component f), where components a) to f) add up to 100% by weight.

The polyurethane urea used in accordance with the invention preferably has a number-average molecular weight $M_n$ of $\geq 3000$ and $\leq 100\,000$ g/mol, more preferably of $\geq 5000$ and $\leq 50\,000$ g/mol. Polyurethane ureas of this molar mass are particularly suitable for obtaining coatings having good mechanical properties.

In a preferred embodiment of the invention, the polyurethane urea used in accordance with the invention is formed from
  a) at least one of an aliphatic, an araliphatic and a cycloaliphatic diisocyanate having at least one isocyanate group bonded to a secondary or tertiary carbon atom,
  b) at least one polyether polyol having a number-average molecular weight $M_n$ of $\geq 500$ and $\leq 2500$ g/mol and a hydroxyl functionality of $\geq 1.9$ and $\leq 3$,
  c2) at least one amino-functional compound selected from symmetric diamines having at least two isocyanate-reactive amino groups bonded to primary and secondary carbon atoms,
  d) optionally, at least one alcohol having at least two hydroxyl groups and a molar mass of $\geq 60$ and $\leq 399$ g/mol,
  e) optionally, at least one compound having a group reactive toward isocyanate groups and
  f) optionally, $\leq 20\%$ by weight, based on the total mass of the polyurethane urea, of at least one different polyol than b) having a number-average molecular weight $M_n$ of $\geq 500$ and $\leq 6000$ g/mol and a hydroxyl functionality of $\geq 1.5$ and $\leq 4$.

Further preferably, the polyurethane urea, in this aforementioned embodiment, is formed from $\geq 5\%$ and $\leq 60\%$ by weight of component a), $\geq 30\%$ and $\leq 90\%$ by weight of component b), $\geq 2\%$ and $\leq 25\%$ by weight of component c2), $\geq 0\%$ and $\leq 10\%$ by weight of component d), $\geq 0\%$ and $\leq 10\%$ by weight of component e) and $\geq 0\%$ and $\leq 20\%$ by weight of component f), based in each case on the total mass of the polyurethane urea, where components a) to f) add up to 100% by weight.

More preferably, the polyurethane urea, in this aforementioned embodiment, is formed from $\geq 10\%$ and $\leq 40\%$ by weight of component a), $\geq 55\%$ and $\leq 85\%$ by weight of component b), $\geq 5\%$ and $\leq 20\%$ by weight of component c2), $\geq 0\%$ and $\leq 3\%$ by weight of component d), $\geq 0\%$ and $\leq 3\%$ by weight of component e) and $\geq 0\%$ and $\leq 1\%$ by weight of component f), based in each case on the total mass of the polyurethane urea, where components a) to f) add up to 100% by weight.

In a particularly preferred embodiment of the invention, the polyurethane urea used in accordance with the invention is formed from
  a) at least one isocyanate selected from IPDI and H12-MDI,
  b) at least one polyether polyol having a number-average molecular weight $M_n \geq 500$ and $\leq 2500$ g/mol and a hydroxyl functionality of $\geq 1.9$ and $\leq 3$, selected from polypropylene glycols and poly(tetramethylene glycol) polyether polyols,
  c2) at least one amino-functional compound, selected from ethylenediamine and H12-MDA,
  d) optionally at least one alcohol having at least two hydroxyl groups and a molar mass of $\geq 60$ and $\leq 399$ g/mol,
  e) optionally at least one compound having a group reactive toward isocyanate groups and
  f) optionally $\leq 20\%$ by weight, based on the total mass of the polyurethane urea, of at least one different polyol than b) having a number-average molecular weight $M_n$ of $\geq 500$ and $\leq 6000$ g/mol and a hydroxyl functionality of $\geq 1.5$ and $\leq 4$.

Further preferably, the polyurethane urea, in this aforementioned embodiment, is formed from $\geq 5\%$ and $\leq 60\%$ by weight of component a), $\geq 30\%$ and $\leq 90\%$ by weight of component b), $\geq 2\%$ and $\leq 25\%$ by weight of component c2), $\geq 0\%$ and $\leq 10\%$ by weight of component d), $\geq 0\%$ and $\leq 10\%$ by weight of component e) and $\geq 0\%$ and $\leq 20\%$ by weight of component f), based in each case on the total mass of the polyurethane urea, where components a) to f) add up to 100% by weight.

More preferably, the polyurethane urea, in this aforementioned embodiment, is formed from $\geq 10\%$ and $\leq 40\%$ by weight of component a), $\geq 55\%$ and $\leq 85\%$ by weight of component b), $\geq 5\%$ and $\leq 20\%$ by weight of component c2), $\geq 0\%$ and $\leq 3\%$ by weight of component d), $\geq 0\%$ and $\leq 3\%$ by weight of component e) and $\geq 0\%$ and $\leq 1\%$ by weight of component f), based in each case on the total mass of the polyurethane urea, where components a) to f) add up to 100% by weight.

Preferably, the polyurethane urea is formed from components a) to c2) and optionally d) to f), more preferably from components a) to c2).

Suitable solvents or constituents of the solvent mixture are in principle all monohydroxy-functional aliphatic alcohols having one to six carbon atoms, for example methanol, ethanol, n-propanol, isopropanol, n-butanol, sec-butanol or butylglycol.

More preferably, the monohydroxy-functional alcohol is ethanol or isopropanol, most preferably isopropanol.

If a solvent mixture is used, as well as the monohydroxy-functional alcohols, it is also possible to use ≤8% by weight of a further organic solvent. Suitable solvents here are, for example, esters, for example ethyl acetate, butyl acetate, methoxypropyl acetate or butyrolactone, ketones, for example acetone or methyl ethyl ketone, ethers, for example tetrahydrofuran or tert-butyl methyl ether, aromatic solvents, for example xylene or solvent naphtha. In the case of use of ethanol, typical denaturing agents may be present as additives in the customary added amounts.

Preferably, the proportion of the further organic solvents is ≤5% by weight, more preferably ≤2% by weight and most preferably ≤1% by weight, based on the total mass of the solvent mixture. In a most preferred embodiment, no further organic solvents are present aside from monohydroxy-functional aliphatic alcohols.

Further solvents that are disadvantageous are solvents such as dimethyl-formamide, N-methylpyrrolidone or toluene, for example, as used as co-solvents for polyurethanes or polyurethane ureas.

The further solvents are not water. The polyurethane urea solution obtained by dissolving the polyurethane urea in the solvents or solvent mixture is used in accordance with the invention is preferably anhydrous, excluding the proportions of water present as a result of the preparation in the organic solvents used.

The water content of the polyurethane urea solution is ≤8% by weight, preferably ≤4.5% by weight and most preferably ≤1% by weight, based on the total mass of the polyurethane urea solution.

The proportion of the polyurethane urea in the polyurethane urea solution used in accordance with the invention (also referred to as solids content) is preferably ≥10% and ≤80% by weight, more preferably ≥15% and ≤60% by weight and most preferably ≥20% and ≤50% by weight, based on the total weight of the polyurethane urea solution.

Preferably, the dissolved polyurethane urea of the invention is a clear, storage-stable solution.

"Clear" in the context of the present invention means that the turbidity values of the solution are ≤200 NTU (Nephelometric Turbidity Unit), preferably ≤50 NTU, more preferably ≤10 NTU and most preferably ≤3 NTU. Turbidity values are determined by a scattered light measurement at a 90° angle (nephelometry) at a measurement radiation wavelength of 860 nm in accordance with DIN EN ISO 7027, conducted at 23° C. with a model 2100AN laboratory turbidimeter from HACH LANGE GmbH, Berlin, Germany.

"Storage-stable" in the context of the present invention is when the solution has no increase in turbidity and no increase in viscosity compared to the starting state even after at least three weeks, but preferably even after three months.

The present invention likewise encompasses a process for preparing the polyurethane urea of the invention, wherein components a) and b) and optionally d) and f) are converted to an NCO-terminated prepolymer in a first step and then the latter are reacted with component c2) and optionally components d) and e) in a further step.

Preference is given in the process of the invention to initially charging the NCO-terminated prepolymer, and metering in component c2) and optionally components d) and e).

In the process of the invention, preferably, components a) and b) and optionally d) and f) for preparation of an NCO-terminated prepolymer are initially charged in full or in part, optionally diluted with a solvent inert toward isocyanate groups, and heated up to temperatures in the range from 50 to 120° C. The isocyanate addition reaction can be accelerated using the catalysts known in polyurethane chemistry. A preferred variant, however, works without the addition of urethanization catalysts.

Subsequently, any constituents of a) and b) and optionally d) and f) which have not yet been added at the start of the reaction can be metered in.

In the preparation of the NCO-terminated prepolymers from components a) and b) and optionally d) and f), the molar ratio of isocyanate groups to isocyanate reactive groups is preferably ≥1.05 and ≤3.5, more preferably ≥1.1 and ≤3.0 and most preferably ≥1.1 and ≤2.5.

The conversion of components a) and b) and optionally d) and f) to the prepolymer is effected in part or in full, but preferably in full. In this way, polyurethane prepolymers containing free isocyanate groups are obtained in substance or in solution.

Preferably, the NCO-terminated prepolymer is prepared from components a) and b).

Thereafter, preferably, in a further process step, if this has been done only partly, if at all, the prepolymer obtained is dissolved with the aid of one or more organic solvents. The solvent used is preferably likewise a solvent or solvent mixture, where the solvent consists of one or more monohydroxy-functional alcohols or a solvent mixture consisting of organic solvents containing ≥50% by weight, based on the total mass of the solvent mixture, of at least one monohydroxy-functional alcohol is used. In respect of the solvent and solvent mixture, the preferred embodiments above relating to the solvent or solvent mixture in which the polyurethane urea is dissolved are likewise applicable. The solvent or solvent mixture may also be different than the solvent or solvent mixture in which the polyurethane urea is dissolved.

The solvent or solvent mixture may also be different than the solvent or solvent mixture in which the polyurethane urea as end product is dissolved at a later stage. The solvent or solvent mixture is preferably identical to the solvent or solvent mixture in which the polyurethane urea as end product is dissolved at a later stage.

Preferably, the solvent used in the preparation comprises one or more monohydroxy-functionalized alcohols.

The ratio of solvent to prepolymer is preferably ≥1:10 and ≤5:1, more preferably ≥1:2 and ≤2:1, parts by weight.

Prior to the dissolution, the prepolymer is cooled down to temperatures of −20 to 60° C., preferably 0 to 50° C. and more preferably 15 to 40° C.

In a further step that optionally follows the dissolution of the NCO-terminated prepolymer, the NCO-terminated prepolymer obtained in the first step is then preferably reacted fully or partly with component c2) and optionally components d) and e). This reaction is generally referred to as chain extension, or in the case of component e) as chain termination.

Preference is given here to initially charging the NCO-terminated prepolymer, and metering in components c2) and optionally d) and e). Preference is given to firstly partly reacting the NCO groups of the prepolymer with components c2) and optionally d), followed by chain termination by reaction of the remaining NCO groups with component e). Components c2) and optionally e) may also be added stepwise in two or more steps, especially in two steps.

Component c2) and optionally components d) and e) are preferably used dissolved in one or more organic solvents. The solvent used is preferably likewise a solvent or solvent mixture, where the solvent consists of one or more monohydroxy-functional alcohols or a solvent mixture consisting of organic solvents containing ≥50% by weight, based on the total mass of the solvent mixture, of at least one monohydroxy-functional alcohol is used. In respect of the solvent and solvent mixture, the preferred embodiments below relating to the solvent or solvent mixture in which the polyurethane urea is dissolved are likewise applicable. The solvent or solvent mixture may also be different than the solvent or solvent mixture in which the polyurethane urea as end product is dissolved at a later stage. The solvent or solvent mixture is preferably identical to the solvent or solvent mixture in which the polyurethane urea as end product is dissolved at a later stage.

Preferably, the solvent used in the preparation for component c2) comprises one or more monohydroxy-functionalized alcohols.

When solvents are used as diluents, the diluent content in the components c2) used in the chain extension, and optionally d) and e), is preferably 1% to 95% by weight, preferably 3% to 50% by weight, based on the total weight of component c2) and optionally d) and e) including diluents.

Components c2) and optionally d) and e) are preferably added at temperatures of −20 to 60° C., preferably 0 to 50° C. and more preferably of 15 to 40° C.

The degree of chain extension, i.e. the molar ratio of NCO-reactive groups of the components c2) used for chain extension and chain termination, and optionally d) and e), to free NCO groups of the prepolymer, is especially ≥50 and ≤150%, preferably ≥50 and ≤120%, more preferably ≥60 and ≤100% and most preferably ≥70 and ≤95%.

Preferably, the molar ratio of isocyanate-reactive groups of component c2) to the free NCO groups of the prepolymer is ≥50% and ≤150%, preferably ≥50% and ≤120%, more preferably ≥60% and ≤100% and most preferably ≥70% and ≤95%.

In a preferred embodiment of the invention, the free NCO groups of the prepolymer are only partly reacted with component c2), the molar ratio of isocyanate-reactive groups of component c2) to the free NCO groups of the prepolymer preferably being ≥60% and ≤95% and the remaining free NCO groups being depleted by reaction with the hydroxyl groups of the solvent, so as to form an NCO-free polyurethane urea.

After the preparation, the polyurethane urea, if solvents or solvent mixtures of the invention have already been used in the preparation process, can still be diluted and dissolved with a solvent or solvent mixture, in which case the solvent consists of one or more monohydroxy-functional alcohols or a solvent mixture consisting of organic solvents containing ≥50% by weight, based on the total mass of the solvent mixture, of at least one mono-hydroxy-functional alcohol is used.

If no solvents or solvent mixtures have been used during the reaction, after the polyurethane urea has been prepared, it is used in a solvent or solvent mixture, in which case the solvent consists of one or more mono-hydroxy-functional alcohols or a solvent mixture consisting of organic solvents and containing ≥92% by weight, based on the total mass of the solvent mixture, of at least one monohydroxy-functional alcohol is used.

The dissolution of the polyurethane urea can be effected by standard techniques for shearing, for example by stirring with standard stirrers as specified in DIN 28131.

The present invention further encompasses a polyurethane urea obtainable by the preparation process of the invention.

The invention further provides for the use of the polyurethane urea of the invention for coating of substrates.

Suitable substrates are, for example, textile materials, sheetlike substrates made of metal, glass, ceramic, concrete, natural rock, leather, natural fibers and plastics such as PVC, polyolefins, polyurethane or the like. Preferably, the substrates are textile materials and leather.

More preferably, the substrates are textile fabrics, especially preferably fibrous materials.

Textile fabrics in the context of the invention include, for example, woven fabrics, knitted fabrics, and bonded and unbonded nonwoven fabrics. The textile fabrics may be formed from synthetic or natural fibers and/or mixtures thereof.

The use of the polyurethane urea of the invention is especially suitable for coating or production of outerwear, synthetic leather articles, shoes, furniture covers, automobile interior trim articles, sports equipment, textile materials for building applications, tarpaulins, tents and industrial textiles, for example conveyor belts.

The invention further provides for the use of the polyurethane urea of the invention for production of free films. This is preferably likewise effected by coating of substrates, especially of shaped bodies. Free films are understood to mean films that are detachable from their carrier and can be used independently of the carrier material. They are preferably continuous, compact films.

The free films can be produced by spray application or by a dipping method.

Preferably, the free films are produced by a dipping method. A shaped body, preferably made from glass, ceramic materials or metal, can be dipped here into the polyurethane urea solution. By coagulation of the polyurethane urea solution, it is then possible to produce a free film which can be used without carrier material. The coagulation is preferably effected by contacting with a medium that triggers the coagulation, especially with water.

The invention further provides free films produced using the polyurethane urea of the invention, especially preferably produced by a dipping method.

The film is obtained preferably have a layer thickness of ≥0.005 and ≤1 mm, more preferably ≥0.03 and ≤0.1 mm. The films of the invention are suitable for production of, for example, condoms, air balloons, gloves and protective shells.

The invention provides a polyurethane urea dissolved in a solvent or solvent mixture, where the solvent comprises one or more monohydroxy-functional alcohols or a solvent mixture comprising organic solvents and containing ≥92% by weight, based on the total mass of the solvent mixture, of at least one monohydroxy-functional alcohol is used, characterized in that the polyurethane urea has been formed from a) at least one of an araliphatic, an aliphatic and a cycloaliphatic diisocyanate, b) at least one polyether polyol having a number-average molecular weight $M_n$ of ≥400 and ≤6000 g/mol, determined by means of GPC at 23° C. in THF, and a mean hydroxyl functionality of ≥1.5 and ≤4, c2) at least one amino-functional compound selected from symmetric diamines having at least two isocyanate-reactive amino groups bonded to primary or secondary carbon atoms, d) optionally, at least one alcohol having at least two hydroxyl groups and a molar mass of ≥60 and ≤399 g/mol, e) optionally, at least one compound having a group reactive toward isocyanate groups, f) optionally, ≤20% by weight, based on the total mass of the polyurethane urea, of at least one polyol differing from b)

having a number-average molecular weight $M_n$ of ≥500 and ≤6000 g/mol and a mean hydroxyl functionality of ≥1.5 and ≤4.

In a first preferred embodiment of the polyurethane urea of the invention, component b) is selected from poly(tetramethylene glycol) polyether polyols.

A second preferred embodiment of the invention comprises a polyurethane urea according to any of the abovementioned embodiments of the invention, characterized in that component a) is selected from aliphatic and cycloaliphatic diisocyanates having at least one isocyanate group bonded to a secondary and tertiary carbon atom.

A third preferred embodiment of the invention comprises a polyurethane urea according to any of the abovementioned embodiments of the invention, characterized in that component a) is selected from IPDI and H12-MDI.

A fourth preferred embodiment of the invention comprises a polyurethane urea according to any of the abovementioned embodiments of the invention, characterized in that component b) has a number-average molecular weight $M_n$ of ≥500 and ≤2500 g/mol and a hydroxyl functionality of ≥1.9 and ≤3.

A fifth preferred embodiment of the invention comprises a polyurethane urea according to any of the abovementioned embodiments of the invention, characterized in that component a) is selected from aliphatic, araliphatic and/or cycloaliphatic diisocyanates having at least one isocyanate group bonded to a tertiary carbon atom.

A sixth preferred embodiment of the invention comprises a polyurethane urea according to any of the abovementioned embodiments of the invention, characterized in that component a) is selected from IPDI and H12-MDI.

A seventh preferred embodiment of the invention comprises a polyurethane urea according to any of the abovementioned embodiments of the invention, characterized in that component c2) is selected from ethylenediamine and H12-MDA.

An eighth preferred embodiment of the invention comprises a polyurethane urea according to any of the above-mentioned embodiments of the invention, characterized in that the solvent mixture contains ≥99% by weight of monohydroxy-functional alcohols.

A ninth preferred embodiment of the invention comprises a polyurethane urea according to any of the abovementioned embodiments of the invention, characterized in that the monohydroxy-functional alcohols are selected from aliphatic alcohols having ≥1 and ≤6 carbon atoms.

A tenth preferred embodiment of the invention comprises a polyurethane urea according to any of the abovementioned embodiments of the invention, characterized in that the monohydroxy-functional alcohol is ethanol or isopropanol or a mixture of those.

The present invention likewise encompasses a process for preparing the polyurethane urea of the invention, wherein components a) and b) and optionally d) and f) are converted to an NCO-terminated prepolymer in a first step and then the latter are reacted with component c2) and optionally components d) and e) in a further step.

A preferred embodiment of the invention comprises a process according to the abovementioned embodiment of the invention, characterized in that the NCO-terminated prepolymer is initially charged and component c) and optionally components d) and e) are added.

A preferred embodiment of the invention comprises a process according to the abovementioned embodiments of the invention, characterized in that the molar ratio of isocyanate-reactive groups of component c) to the free NCO groups of the prepolymer is ≥70% and ≤95%.

The present invention likewise encompasses a polyurethane urea obtainable by one of the abovementioned embodiments of the process of the invention.

The present invention is elucidated by the following examples.

EXAMPLES

Unless indicated otherwise, all percentages are based on weight.

Unless stated otherwise, all analytical measurements relate to temperatures of 23° C. The solids contents (non-volatile component) were determined to DIN-EN ISO 3251. Unless explicitly mentioned otherwise, NCO contents were determined by volumetric means to DIN-EN ISO 11909.

The check for free NCO groups was conducted by means of IR spectroscopy (band at 2260 cm$^{-1}$).

The viscosities reported were determined by means of rotary viscometry to DIN 53019 at 23° C. with a rotary viscometer from Anton Paar Germany GmbH, Ostfildern, DE.

The number-average molecular weight is always determined in the context of this application by gel permeation chromatography (GPC) in tetrahydrofuran at 23° C. The procedure is according to DIN 55672-1: "Gel permeation chromatography, Part 1 tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass are used for calibration. The number-average molecular weight is calculated with software support. Baseline points and evaluation limits are fixed in accordance with DIN 55672 Part 1.

For testing of some of the solutions, a film of thickness 500 μm (based on the condition with solvent) is applied to matt release paper. The drying was effected at 50° C., followed by treatment at 150° C. for 3 minutes. The films obtained were subjected to stress/strain testing according to DIN 53504. The tensile tests were executed with a tensile tester from Zwick, model number 1455, equipped with a load cell with overall measurement range of 500 N in accordance with DIN 53455 with a pulling speed of 50 mm/min. The specimens used were S2 tensile specimens. Each measurement was carried out on three specimens prepared in the same way, and the average value of the data obtained was used for evaluation. Specifically, for this purpose, as well as the breaking strain BS in [MPa] and the elongation at break EB in [%], the strain ST in [MPa] at 100% elongation was determined (100% modulus).

In addition, swelling in water at 23° C. (16 hours) was measured by differential weighing, and the respective increase in weight was reported in percent. In some cases, tests were done on storage under water (at 23° C.) or under moist conditions (70° C.), and the respective values for breaking strain and elongation at break were determined analogously to the procedure described above.

Turbidity values [NTU] were determined by a scattered light measurement at a 90° angle (nephelometry) at a measurement radiation wavelength of 860 nm in accordance with DIN EN ISO 7027, conducted at 23° C. with a model 2100AN laboratory turbidimeter from HACH LANGE GmbH, Berlin, Germany.

Substances and Abbreviations Used:

POLYTHF 2000: polytetramethylene glycol polyol, OH number 56 mg KOH/g, number-average molecular weight 2000 g/mol (BASF AG, Ludwigshafen, DE)

POLYTHF 1000: polytetramethylene glycol polyol, OH number 112 mg KOH/g, number-average molecular weight 1000 g/mol (BASF AG, Ludwigshafen, DE)

Ethanol Unless stated otherwise, MEK-denatured ethanol from Nordbrand, Nordhausen, DE was used.

Isocyanates and the further polymeric polyols were used from Covestro AG (formerly Bayer MaterialScience AG), Leverkusen, DE. Further chemicals were purchased from Sigma-Aldrich Chemie GmbH, Taufkirchen, DE. The raw materials, unless stated otherwise, were used without further purification or pretreatment.

Example 1: Preparation of a Polyurethane Urea Solution in Ethanol (Inventive)

150 g of POLYTHF 2000 and 37.50 g of POLYTHF 1000 were dewatered under membrane pump vacuum at 100° C. for one hour in a standard stirrer apparatus and then initially charged at 80° C. under nitrogen. Then 75.06 g of isophorone diisocyanate were added at 80° C. within 5 min and stirring at 110° C. was continued (about 3 hours) until the NCO value had gone below the theoretical value. The prepolymer was cooled to 40° C. and it was dissolved in 630.4 g of ethanol (denatured with diethyl phthalate) and then the temperature was reduced to 15° C. Then a solution of 37.6 g of methylenebis(4-aminocyclohexane) (H12-MDA) and 270 g of ethanol (denatured with diethyl phthalate) was metered in within 30 min. Stirring was continued until no free isocyanate groups were detectable any longer by IR spectroscopy.

The resultant clear, storage-stable solution had the following properties:
Solids content: 23%
Viscosity (viscometer, 23° C.): 280 mPas
Turbidity value: 1.2 NTU The solution was coated onto a glass plate (doctor blade with 210 micrometer blade gap) and, after drying at room temperature, a detachable, transparent, colorless and elastic film was obtained.

Example 2: Preparation of a Polyurethane Urea Solution in Ethanol (Inventive)

300 g of POLYTHF 1000 were dewatered under membrane pump vacuum at 100° C. for one hour in a standard stirrer apparatus and then initially charged at 80° C. under nitrogen. Then 133.44 g of isophorone diisocyanate were added at 80° C. within 5 min and stirring at 110° C. was continued (about 3 hours) until the NCO value had gone below the theoretical value. The prepolymer was cooled to 40° C. and it was dissolved in 517 g of ethanol (denatured with MEK) and then the temperature was reduced to 16° C. Then a solution of 58.8 g of methylenebis(4-aminocyclohexane) and 222 g of ethanol (denatured with MEK) was metered in within 30 min; then a further 410 g of ethanol were added. Stirring was continued until no free isocyanate groups were detectable any longer by IR spectroscopy.

The resultant clear, storage-stable solution had the following properties:
Solids content: 30.2%
Viscosity (viscometer, 23° C.): 85 000 mPas The solution was coated onto a glass plate (doctor blade with 210 micrometer blade gap) and, after drying at room temperature, a detachable, transparent, colorless and elastic film was obtained. Swelling in water at 23° C. was 0% after 16 hours. The mechanical properties of the film can be found in Table 1.

TABLE 1

| Before treatment with water ST/BS/EB | Storage in water at 23° C. for 24 h BS/EB |
|---|---|
| 7.6 MPa/55.0 MPa/710% | 39.0 MPa/760% |

Example 3: Coagulation of the Polyurethane Ureas Solutions from Examples 1 and 2 in Water The polyurethane urea solution from Examples 1 and 2 coagulated spontaneously when it was introduced into water at room temperature.

In each case, a sample of the solutions from Examples 1 and 2 were diluted with ethanol to solids content 15% by weight and a glass rod was dipped therein at room temperature. The glass rod was subsequently dipped into a vessel containing demineralized water, and the surface of the polymer solution solidified immediately. An analogous experiment with water at 80° C. showed analogous results; in addition, the polymer sample became very turbid, which indicates good coagulation.

Example 4: Preparation of a Polyurethane Urea Solution in Ethanol (Inventive)

211 g of POLYTHF 2000 and 52.7 g of POLYTHF 1000 were dewatered under membrane pump vacuum at 100° C. for one hour in a standard stirrer apparatus, then 5.4 g of neopentyl glycol were added and the mixture was subsequently initially charged at 80° C. under nitrogen. Then 93.4 g of isophorone diisocyanate were added at 80° C. within 5 min and stirring at 110° C. was continued (about 3 hours) until the NCO value had gone below the theoretical value. The prepolymer was cooled to 40° C. and it was dissolved in 420 g of ethanol (denatured with diethyl phthalate) and then the temperature was reduced to 17° C. Then a solution of 35.3 g of methylenebis(4-aminocyclohexane) and 180 g of ethanol (denatured with diethyl phthalate) was metered in within 30 min. A further 0.67 g of methylenebis(4-aminocyclohexane) were added and then stirring was continued until no free isocyanate groups were detectable any longer by IR spectroscopy.

The resultant clear, storage-stable solution had the following properties:
Solids content: 40.5%
Viscosity (viscometer, 23° C.): 7060 mPas The solution was coated onto a glass plate (doctor blade with 210 micrometer blade gap) and, after drying at room temperature, a detachable, transparent, colorless and elastic film was obtained. Swelling in water at 23° C. was 0% after 16 h. The mechanical properties of the film can be found in Table 2.

TABLE 2

| Before treatment with water ST/BS/EB | Storage in water at 23° C. for 24 hours BS/EB |
|---|---|
| 3.8 MPa/17.3 MPa/980% | 14.6 MPa/1030% |

Example 5: Preparation of a Polyurethane Solution in Ethanol (Inventive)

160 g of POLYTHF 2000 and 40.0 g of POLYTHF 1000 were dewatered under membrane pump vacuum at 100° C. for one hour in a standard stirrer apparatus and then initially charged at 80° C. under nitrogen. Then 62.9 g of bis(4,4'-isocyanatocyclohexyl)methane (H12-MDI) were added at 80° C. within 5 min and stirring at 110° C. was continued (about 3 hours) until the NCO value had gone below the theoretical value. The prepolymer was cooled to 40° C. and it was dissolved in 595 g of ethanol and then the temperature was reduced to 19° C. Then a solution of 20.2 g of methylenebis(4-aminocyclohexane) and 255 g of ethanol was metered in within 30 min. A further 4.5 g of methylenebis(4-aminocyclohexane) were added and then stirring was continued until no free isocyanate groups were detectable any longer by IR spectroscopy.

The resultant clear, storage-stable solution had the following properties:

Solids content: 25.2%

Viscosity (viscometer, 23° C.): 3400 mPas

The solution was coated onto a glass plate (doctor blade with 210 micrometer blade gap) and, after drying at room temperature, a detachable, transparent, colorless and elastic film was obtained. Swelling in water at 23° C. was 0% after 16 h. The mechanical properties of the film can be found in Table 3.

TABLE 3

| Before treatment with water ST/BS/EB | Storage in water at 23° C. for 24 hours BS/EB |
|---|---|
| 3.2 MPa/16.7 MPa/740% | 13.5 MPa/880% |

Example 6: Preparation of a Polyurethane Urea Solution in Ethanol (Inventive)

1350 g of POLYTHF 1000 were dewatered under membrane pump vacuum at 100° C. for one hour in a standard stirrer apparatus and then initially charged at 80° C. under nitrogen. Then 600.5 g of isophorone diisocyanate were added at 80° C. within 5 min and stirring at 110° C. was continued (about 3 hours) until the NCO value had gone below the theoretical value. The prepolymer was cooled to 40° C. and it was dissolved in 2300 g of ethanol and then the temperature was reduced to 16° C. Then a solution of 227 g of methylenebis(4-aminocyclohexane) and 980 g of ethanol was metered in within 30 min. Then stirring was continued until it was no longer possible to detect any free isocyanate groups by IR spectroscopy.

The resultant clear, storage-stable solution had the following properties:

Solids content: 41.5%

Viscosity (viscometer, 23° C.): 46090 mPas

The solution was coated onto a glass plate (doctor blade with 210 micrometer blade gap) and, after drying at room temperature, a detachable, transparent, colorless and elastic film was obtained. Swelling in water at 23° C. was 0% after 16 hours. The mechanical properties of the film can be found in Table 4.

TABLE 4

| Before treatment with water ST/BS/EB | Storage in water at 23° C. for 24 hours BS/EB |
|---|---|
| 6.7 MPa/52.5 MPa/820% | 32.7 MPa/880% |

Example 7: Storage Stability of the Polyurethane Solution from Example 6

The solution for Example 6 was stored at room temperature and the viscosity was determined on a weekly basis. The results of the measurements can be found in Table 5. It was found that the polyurethane solution of the invention is storage-stable, and the viscosity remains substantially stable.

TABLE 5

| Period of time | Viscosity, mPa*s | Appearance |
|---|---|---|
| Zero value | 46090 | Clear |
| After 1 week | 46770 | Clear |
| After 2 weeks | 46900 | Clear |
| After 3 weeks | 48390 | Clear |
| After 5 weeks | 47530 | Clear |
| After 2 months | 47002 | Clear |
| After 3 months | 46070 | Clear |
| After 4 months | 46270 | Clear |
| After 5 months | 43260 | Clear |
| After 6 months | 43140 | Clear |

Example 8: Preparation of a Polyurethane Urea Solution in Ethanol (Inventive)

180 g of POLYTHF 2000, 45.0 g of POLYTHF 1000 and 25.5 g of a linear difunctional amorphous polyester diol based on adipic acid, hexane-1,6-diol and neopentyl glycol and having a number-average molecular weight of 1700 g/mol were dewatered under membrane pump vacuum at 100° C. for one hour in a standard stirrer apparatus and then initially charged at 80° C. under nitrogen. Then 66.7 g of isophorone diisocyanate were added at 80° C. within 5 min and stirring at 110° C. was continued (about 3 hours) until the NCO value had gone below the theoretical value. The prepolymer was cooled to 40° C. and it was dissolved in 720 g of ethanol and then the temperature was reduced to 18° C. Then a solution of 25.2 g of methylenebis(4-aminocyclohexane) and 310 g of ethanol was metered in within 30 min. Then stirring was continued until it was no longer possible to detect any free isocyanate groups by IR spectroscopy.

The resultant clear, storage-stable solution had the following properties:

Solids content: 25.3%

Viscosity (viscometer, 23° C.): 560 mPas

The solution was coated onto a glass plate (doctor blade with 210 micrometer blade gap) and, after drying at room temperature, a detachable, transparent, colorless and elastic film was obtained. Swelling in water at 23° C. was 0% after 16 hours. The mechanical properties of the film can be found in Table 6.

TABLE 6

| Before treatment with water ST/BS/EB | Storage in water at 23° C. for 24 hours BS/EB |
|---|---|
| 2.7 MPa/18.7 MPa/1170% | 12.1 MPa/1340% |

Example 9: Preparation of a Polyurethane Urea Solution in Isopropanol (Inventive)

300 g of POLYTHF 1000 were dewatered under membrane pump vacuum at 100° C. for one hour in a standard stirrer apparatus and then initially charged at 80° C. under nitrogen. Then 133.4 g of isophorone diisocyanate were added at 80° C. within 5 min and stirring at 110° C. was continued (about 3 hours) until the NCO value had gone below the theoretical value. The polymer was cooled down to 40° C. and dissolved in 510 g of isopropanol. Then a solution of 50.40 g of methylenebis(4-aminocyclohexane) and 220 g of isopropanol was metered in at 40° C. within 30 min. A further 720 g of isopropanol was added and then stirring was continued until no free isocyanate groups were detectable any longer by IR spectroscopy.

The resultant clear, storage-stable solution had the following properties:
Solids content: 25.6%
Viscosity (viscometer, 23° C.): 12500 mPas The solution was coated onto a glass plate (doctor blade with 210 micrometer blade gap) and, after drying at room temperature, a detachable, transparent, colorless and elastic film was obtained.

Example 10: Preparation of a Polyurethane Urea Solution in Ethanol (Inventive)

250 g of POLYTHF 2000 and 62.5 g of POLYTHF 1000 were dewatered under membrane pump vacuum at 100° C. for one hour in a standard stirrer apparatus and then initially charged at 80° C. under nitrogen. Then 83.4 g of isophorone diisocyanate were added at 80° C. within 5 min and stirring at 110° C. was continued (about 3 hours) until the NCO value had gone below the theoretical value. The prepolymer was cooled to 40° C. and it was dissolved in 425 g of ethanol and then the temperature was reduced to 18° C. Then a solution of 9.0 g of ethylenediamine and 180 g of ethanol was metered in within 30 min. A further 0.83 g of ethylenediamine was added and then stirring was continued until no free isocyanate groups were detectable any longer by IR spectroscopy.

The resultant clear, storage-stable solution had the following properties:
Solids content: 40.7%
Viscosity (viscometer, 23° C.): 34600 mPas The solution was coated onto a glass plate (doctor blade with 210 micrometer blade gap) and, after drying at room temperature, a detachable, transparent, colorless and elastic film was obtained.

Example 11: Preparation of a Polyurethane Urea Solution in Ethanol (Inventive)

226.2 g of polypropylene glycol having a number-average molecular weight of 2000 g/mol and 62.5 g of polypropylene glycol having a number-average molecular weight of 1000 g/mol were dewatered under membrane pump vacuum at 100° C. for one hour in a standard stirrer apparatus, then the mixture was initially charged at 80° C. under nitrogen. Then 83.4 g of isophorone diisocyanate were added at 80° C. within 5 min and the mixture was stirred at 120° C. for 6 hours until the NCO value had gone below the theoretical value. The prepolymer was cooled to 40° C. and it was dissolved in 280 g of ethanol and then the temperature was reduced to 18° C. Then a solution of 34.1 g of methylenebis (4-aminocyclohexane) and 120 g of ethanol was metered in within 30 min. A further 4.5 g of methylenebis(4-aminocyclohexane) were added and then stirring was continued until no free isocyanate groups were detectable any longer by IR spectroscopy.

The resultant clear, storage-stable solution had the following properties:
Solids content: 49.8%
Viscosity (viscometer, 23° C.): 1100 mPas The solution was coated onto a glass plate (doctor blade with 210 micrometer blade gap) and, after drying at room temperature, a transparent, colorless film was obtained, which tore slightly when pulled off.

Example 12: Preparation of a Polyurethane Urea Solution in Ethanol (Inventive)

200 g of POLYTHF 2000 and 50.0 g of POLYTHF 1000 were dewatered under membrane pump vacuum at 100° C. for one hour in a standard stirrer apparatus and then initially charged at 70° C. under nitrogen. Then 50.4 g of hexamethylene diisocyanate were added at 70° C. within 5 min and stirring at 110° C. was continued (about 3 hours) until the NCO value had gone below the theoretical value. The prepolymer was cooled to 40° C. and it was dissolved in 340 g of ethanol and then the temperature was reduced to 18° C. Because of the high viscosity, a further 270 g of ethanol were added, then a solution of 25.2 g of methylenebis(4-aminocyclohexane) and 150 g of ethanol was metered in within 30 min. Then stirring was continued until it was no longer possible to detect any free isocyanate groups by IR spectroscopy.

The resultant clear, storage-stable solution had the following properties:
Solids content: 30.1%
Viscosity (viscometer, 23° C.): 15500 mPas The solution was coated onto a glass plate (doctor blade with 210 micrometer blade gap) and, after drying at room temperature, a detachable, transparent, colorless and elastic film was obtained.

Example 13: Preparation of a Polyurethane Urea Solution in Ethanol 300 g of POLYTHF 1000 were dewatered under membrane pump vacuum at 100° C. for one hour in a standard stirrer apparatus and then initially charged at 80° C. under nitrogen. Then 133.44 g of isophorone diisocyanate were added at 80° C. within 5 min and stirring at 110° C. was continued (about 3 hours) until the NCO value had gone below the theoretical value. The prepolymer was cooled to 40° C. and it was dissolved in 498 g of ethanol (denatured with MEK) and then the temperature was reduced to 16° C. Then a solution of 40.9 g of isophoronediamine and 213 g of ethanol (denatured with MEK) was metered in within 30 min; then a further 7.15 g of ethanol isophoronediamine were added. Stirring was continued until no free isocyanate groups were detectable any longer by IR spectroscopy.

The resultant clear, storage-stable solution had the following properties:
Solids content: 40.8%
Viscosity (viscometer, 23° C.): 3850 mPas The solution was coated onto a glass plate (doctor blade with 210 micrometer blade gap) and, after drying at room temperature, a detachable, transparent, colorless and elastic film was obtained. However, there were leveling difficulties in the formation of a film.

Comparative Example 1: Attempted Preparation of a Polyurethane Urea Solution in Ethanol 100 g of POLYTHF 2000, 25.0 g of POLYTHF 1000 and 127.5 g of a linear difunctional amorphous polyester diol based on adipic acid, hexane-1,6-diol and neopentyl glycol and having a number-average molecular weight of 1700 g/mol were dewatered under membrane pump vacuum at 100° C. for one hour in a standard stirrer apparatus and then initially charged at 80° C. under nitrogen. Then 66.7 g of isophorone diisocyanate were added at 80° C. within 5 min and stirring at 110° C. was continued (about 3 hours) until the NCO value had gone below the theoretical value. The prepolymer was cooled to 40° C. and it was dissolved in 720 g of ethanol, although the product did not dissolve completely, and then the temperature was reduced to 17° C. Then a solution of 25.2 g of methylenebis(4-aminocyclohexane) and 310 g of ethanol was metered in within 30 min, which gave rise to white turbidity. Then stirring was continued, which did not form a stable solution but resulted in a biphasic mixture from which the solid phase settled out.

Comparative Example 2: Attempted Preparation of a Polyurethane Urea Solution in Ethanol 200 g of a linear difunctional polycarbonate diol based on hexane-1,6-diol, having a number-average molecular weight of 2000 g/mol, and 50 g of a linear difunctional polycarbonate diol based on hexane-1,6-diol, having a number-average molecular weight of 1000 g/mol, were dewatered under membrane pump vacuum at 100° C. for one hour in a standard stirrer apparatus and then initially charged at 80° C. under nitrogen. Then 66.7 g of isophorone diisocyanate were added at 80° C. within 5 min and stirring at 110° C. was continued (about 3 hours) until the NCO value had gone below the theoretical value. The prepolymer was cooled to 40° C. and it was dissolved in 720 g of ethanol, although the product did not dissolve completely, and then the temperature was reduced to 17° C. Then a solution of 25.2 g of methylenebis(4-aminocyclohexane) and 310 g of ethanol was metered in within 30 min, which gave rise to a biphasic mixture. Then stirring was continued, which did not form a stable solution but resulted in a biphasic mixture from which the solid phase settled out.

Comparative Example 3: Attempted Preparation of a Polyurethane Urea Solution in Ethanol 225 g of POLYTHF 1000 were dewatered under membrane pump vacuum at 100° C. for one hour in a standard stirrer apparatus and then initially charged at 80° C. under nitrogen. Then 78.3 g of DESMODUR T 80 (tolylene diisocyanate) were added at 80° C. within 5 min and stirring at 110° C. was continued (about 1 hour) until the NCO value had gone below the theoretical value. The prepolymer was cooled to 40° C. and it was dissolved in 570 g of ethanol (denatured with MEK) and then the temperature was reduced to 16° C. Then a solution of 44.1 g of methylenebis(4-aminocyclohexane) and 222 g of ethanol (denatured with MEK) was metered in within 30 min; then a further 410 g of ethanol were added. Stirring was continued until no free isocyanate groups were detectable any longer by IR spectroscopy.

The resultant clear, storage-stable solution had the following properties:
Solids content: 28.6%
Viscosity (viscometer, 23° C.): 30 mPas The solution was coated onto a glass plate (doctor blade with 210 micrometer blade gap) and, after drying at room temperature, no elastic film was obtained, but rather a tacky residue.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A process for coating textiles and/or leather, characterized in that at least one polyurethane urea dissolved in a solvent or solvent mixture is used, where the solvent consists of one or more monohydroxy-functional alcohols or a solvent mixture consisting of organic solvents containing >80% by weight, based on the total mass of the solvent mixture, of at least one monohydroxy-functional alcohol is used, and where the polyurethane urea is formed from a) at least one araliphatic, aliphatic and cycloaliphatic diisocyanate, b) at least one polyether polyol having a number-average molecular weight $M_n$ of ≥400 and ≤6000 g/mol, determined by means of GPC in THF at 23° C., and a mean hydroxyl functionality of ≥1.5 and ≤4, c) at least one amino-functional compound having at least two isocyanate-reactive amino groups, d) optionally, at least one alcohol having at least two hydroxyl groups and a molar mass of ≥60 and ≤399 g/mol, e) optionally, at least one compound having a group reactive toward isocyanate groups, f) optionally, ≤20% by weight, based on the total mass of the polyurethane urea, of at least one different polyol than b) having a number-average molecular weight $M_n$ of ≥500 and ≤6000 g/mol and a mean hydroxyl functionality of ≥1.5 and ≤4.

2. The process as in clause 1, characterized in that component b) is selected from poly(tetramethylene glycol) polyether polyols.

3. The process as in clause 1 or 2, characterized in that component a) is selected from aliphatic and/or cycloaliphatic diisocyanates having at least one isocyanate group bonded to a secondary and/or tertiary carbon atom.

4. The process as in any of clauses 1 to 3, characterized in that component a) is selected from IPDI and H12-MDI.

5. The process as in any of clauses 1 to 4, characterized in that component c) is selected from amines having at least two isocyanate-reactive amino groups bonded to primary and/or secondary carbon atoms.

6. The process as in any of clauses 1 to 5, characterized in that component c) is selected from diamines of symmetric structure.

7. The process as in any of clauses 1 to 6, characterized in that component c) is selected from ethylenediamine and/or H12-MDA.

8. The process as in any of clauses 1 to 7, characterized in that the solvent mixture contains ≥99% by weight of monohydroxy-functional alcohols.

9. The process as in any of clauses 1 to 8, characterized in that the monohydroxy-functional alcohol is ethanol and/or isopropanol.

10. The process as in any of clauses 1 to 9, characterized in that the polyurethaneurea is prepared by converting components a) and b) and optionally d) and f) to an NCO-terminated prepolymer in a first step and then reacting the latter with component c) and optionally components d) and e) in a further step.

11. The process as in clause 10, characterized in that the NCO-terminated prepolymer is initially charged and component c) and optionally components d) and e) are added.

12. The process as in clause 10 or 11, characterized in that the molar ratio of isocyanate-reactive groups of component c) to the free NCO groups of the prepolymer is ≥70% and ≤95%.

13. The process as in any of clauses 1 to 12, characterized in that the dissolved polyurethane urea is applied to a textile material and/or leather in a first step and the polyurethane urea is coagulated upon and/or within the textile fabric and/or leather by contact with water in a subsequent step.

14. A textile and/or leather coating obtainable by a process as claimed in any of clauses 1 to 13.

15. A polyurethane urea dissolved in a solvent or solvent mixture, where the solvent consists of one or more monohydroxy-functional alcohols or a solvent mixture consisting of organic solvents containing ≥92% by weight, based on the total mass of the solvent mixture, of at least one monohydroxy-functional alcohol is used, characterized in that the polyurethaneurea is formed from a) at least one araliphatic, aliphatic and/or cycloaliphatic diisocyanate, b) at least one polyether polyol having a number-average molecular weight $M_n$ of ≥400 and ≤6000 g/mol, determined by means of GPC in THF at 23° C., and a mean hydroxyl functionality of ≥1.5 and ≤4, c2) at least one amino-functional compound selected from symmetric di-amines having at least two isocyanate-reactive amino groups bonded to primary and/or secondary carbon atoms, d) optionally, at least one alcohol having at least two hydroxyl groups and a molar mass of ≥60 and ≤399 g/mol, e) optionally, at least one compound having a group reactive toward iso-cyanate groups, f) optionally, ≤20% by weight, based on the total mass of the polyurethaneurea, of at least one different polyol than b) having a number-average molecular weight $M_n$ of ≥500 and ≤6000 g/mol and a mean hydroxyl functionality of ≥1.5 and ≤4.

16. The polyurethane urea as in clause 15, characterized in that component c) is selected from ethylenediamine and/or H12-MDA.

17. The use of the polyurethane urea as in either of clauses 15 or 16 for coating of substrates.

18. The use of the polyurethaneurea as claimed in either of clauses 15 or 16 for production of free films.

The invention claimed is:

1. A process for coating one of textiles and leather, comprising applying to the one of textiles and leather at least one polyurethane urea formed from a) at least one of an araliphatic, an aliphatic and a cycloaliphatic diisocyanate, b) at least one polyether polyol having a number-average molecular weight $M_n$ of ≥400 and ≤6000 g/mol, determined by means of gel permeation chromatography (GPC) in tetrahydrofuran (THF) at 23° C., and a mean hydroxyl functionality of ≥1.5 and ≤4, c) at least one amino-functional compound having at least two isocyanate-reactive amino groups, d) optionally, at least one alcohol having at least two hydroxyl groups and a molar mass of ≥60 and ≤399 g/mol, e) optionally, at least one compound having a group reactive toward isocyanate groups, f) optionally, ≤20% by weight, based on the total mass of the at least one polyurethane urea, of at least one different polyol than b) having a number-average molecular weight $M_n$ of ≥500 and ≤6000 g/mol and a mean hydroxyl functionality of ≥1.5 and ≤4, wherein the at least one polyurethane urea is dissolved in a solvent or solvent mixture, wherein the solvent consists of one or more monohydroxy-functional alcohols or a solvent mixture consisting of organic solvents containing >80% by weight, based on the total mass of the solvent mixture, of at least one monohydroxy-functional alcohol.

2. The process according to claim 1, wherein component b) is a poly(tetramethylene glycol) polyether polyol.

3. The process according to claim 1, wherein component a) is selected from the group consisting of aliphatic and cycloaliphatic diisocyanates having at least one isocyanate group bonded to a secondary or tertiary carbon atom.

4. The process according to claim 1, wherein component a) is selected from the group consisting of isophorone diisocyanate (IPDI) and bis(4,4' isocyanatocyclohexyl) methane (H12-MDI).

5. The process according to claim 1, wherein component c) is selected from amines having at least two isocyanate-reactive amino groups bonded to primary or secondary carbon atoms.

6. The process according to claim 1, wherein component c) comprises a diamine of symmetric structure.

7. The process according to claim 1, wherein component c) is selected from the group consisting of ethylenediamine and bis(4,4' isocyanatocyclohexyl) methane (H12-MDA).

8. The process according to claim 1, wherein the solvent mixture contains ≥99% by weight of monohydroxy-functional alcohols.

9. The process according to claim 1, wherein the monohydroxy-functional alcohol is selected from the group consisting of ethanol and isopropanol and mixtures thereof.

10. The process according to claim 1, further including preparing the at least one polyurethane urea by converting components a) and b) and optionally d) and f) into an NCO-terminated prepolymer in a first step and reacting the NCO-terminated prepolymer of the first step with component c) and optionally components d) and e).

11. The process according to claim 10, wherein the NCO-terminated prepolymer is initially charged and component c) and optionally components d) and e) are added.

12. The process according to claim 10, wherein the molar ratio of isocyanate-reactive groups of component c) to the free NCO groups of the prepolymer is ≥70% and ≤95%.

13. The process according to claim 1, further including applying the dissolved at least one polyurethane urea to one of a textile material and a leather and coagulating the at least one polyurethane urea upon or within the one of the textile material and leather.

14. One of a textile and a leather coating obtained by the process according to claim 1.

15. A polyurethane urea formed from
a) at least one of an araliphatic, an aliphatic and a cycloaliphatic diisocyanate,
b) at least one polyether polyol having a number-average molecular weight $M_n$ of ≥400 and ≤6000 g/mol, determined by means of gel permeation chromatography (GPC) in tetrahydrofuran (THF) at 23° C., and a mean hydroxyl functionality of ≥1.5 and ≤4,
c2) at least one amino-functional compound selected from symmetric diamines having at least two isocyanate-reactive amino groups bonded to primary or secondary carbon atoms,
d) optionally, at least one alcohol having at least two hydroxyl groups and a molar mass of ≥60 and ≤399 g/mol,
e) optionally, at least one compound having a group reactive toward isocyanate groups,
f) optionally, ≤20% by weight, based on the total mass of the polyurethane urea, of at least one different polyol than b) having a number-average molecular weight $M_n$ of ≥500 and ≤6000 g/mol and a mean hydroxyl functionality of ≥1.5 and ≤4, wherein the polyurethane urea is dissolved in a solvent or solvent mixture, wherein the solvent consists of one or more monohydroxy-functional alcohols or a solvent mixture consisting of organic solvents containing ≥92% by weight, based on the total mass of the solvent mixture, of at least one monohydroxy-functional alcohol.

16. The polyurethane urea according to claim 15, wherein component c) is selected from the group consisting of ethylenediamine and bis(4,4' isocyanatocyclohexyl) methane (H12-MDA).

17. A process for coating of substrates, comprising including the polyurethane urea according to claim 15 in a coating applied to a substrate.

18. A process for production of free films, comprising applying the polyurethane urea according to claim 15 to a shaped body and coagulating the polyurethane urea.

* * * * *